(12) United States Patent
Moyle et al.

(10) Patent No.: US 9,635,047 B2
(45) Date of Patent: *Apr. 25, 2017

(54) USER BEHAVIORAL RISK ASSESSMENT

(71) Applicant: McAfee, Inc., Santa Clara, CA (US)

(72) Inventors: Michael Mason Moyle, Medford, OR (US); Prasanna Ganapathi Basavapatna, Bangalore (IN); Sven Schrecker, Mission Viejo, CA (US)

(73) Assignee: McAfee, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/723,192

(22) Filed: May 27, 2015

(65) Prior Publication Data

US 2015/0334129 A1    Nov. 19, 2015

Related U.S. Application Data

(63) Continuation of application No. 13/334,474, filed on Dec. 22, 2011, now Pat. No. 9,058,486.
(Continued)

(51) Int. Cl.
*G06F 11/00* (2006.01)
*H04L 29/06* (2006.01)
*G06F 21/55* (2013.01)

(52) U.S. Cl.
CPC ........ *H04L 63/1433* (2013.01); *G06F 21/552* (2013.01); *H04L 63/1425* (2013.01); *H04L 63/20* (2013.01)

(58) Field of Classification Search
CPC ........ G06F 21/00; G06F 15/16; G06F 21/552; H04L 63/1433
(Continued)

(56) References Cited

U.S. PATENT DOCUMENTS 5,222,197 A    6/1993   Teng et al.
5,987,610 A    11/1999  Franczek et al.
(Continued)

FOREIGN PATENT DOCUMENTS

CN    101375546 A    2/2009
EP    2 515 252 A2    10/2012
(Continued)

OTHER PUBLICATIONS

Information Technology Risk Management, Copyright 2002, © Glen B. Alleman, Niwor, Colorado, 22 pages.
(Continued)

*Primary Examiner* — Abu Sholeman
(74) *Attorney, Agent, or Firm* — Patent Capital Group

(57) ABSTRACT

A particular activity performed by a particular user of a computing device is identified, for instance, by an agent installed on the computing device. It is determined that the particular activity qualifies as a particular use violation in a plurality of pre-defined use violations. A behavioral risk score for the particular score for the user is determined based at least in part on the determination that the particular activity of the particular user qualifies as a particular use violation. Determining that the particular activity qualifies as a particular use violation can include determining that the particular activity violates a particular rule or event trigger corresponding to a particular pre-defined use violation.

19 Claims, 13 Drawing Sheets

Related U.S. Application Data

(60) Provisional application No. 61/548,292, filed on Oct. 18, 2011, provisional application No. 61/548,276, filed on Oct. 18, 2011.

(58) Field of Classification Search
USPC .................................. 726/1, 2, 22, 23, 28
See application file for complete search history.

(56) References Cited

U.S. PATENT DOCUMENTS

| | | | |
|---|---|---|---|
| 6,073,142 | A | 6/2000 | Geiger et al. |
| 6,460,050 | B1 | 10/2002 | Pace et al. |
| 7,493,659 | B1 | 2/2009 | Wu et al. |
| 7,506,155 | B1 | 3/2009 | Stewart et al. |
| 7,631,355 | B2 | 12/2009 | Bolt et al. |
| 7,761,917 | B1* | 7/2010 | Kumar ............... H04L 63/0263 726/23 |
| 7,841,008 | B1 | 11/2010 | Cole et al. |
| 8,181,253 | B1 | 5/2012 | Zaitsev et al. |
| 8,280,833 | B2* | 10/2012 | Miltonberger ....... G06Q 10/067 705/348 |
| 8,782,782 | B1* | 7/2014 | Dicovitsky .......... H04L 63/102 706/48 |
| 8,881,289 | B2 | 11/2014 | Basavapatna et al. |
| 9,058,486 | B2 | 6/2015 | Moyle et al. |
| 9,256,740 | B2 | 2/2016 | Suzio et al. |
| 9,336,385 | B1 | 5/2016 | Spencer et al. |
| 2002/0184080 | A1 | 12/2002 | Murad et al. |
| 2004/0081120 | A1 | 4/2004 | Chaskar |
| 2004/0088561 | A1* | 5/2004 | Dettinger ............. G06F 21/577 726/27 |
| 2005/0097364 | A1 | 5/2005 | Edeki et al. |
| 2005/0154913 | A1 | 7/2005 | Barriga et al. |
| 2005/0188423 | A1 | 8/2005 | Motsinger et al. |
| 2005/0203881 | A1 | 9/2005 | Sakamoto et al. |
| 2005/0277420 | A1 | 12/2005 | Shin et al. |
| 2006/0031938 | A1* | 2/2006 | Choi .................... G06F 21/552 726/25 |
| 2006/0095963 | A1 | 5/2006 | Crosby et al. |
| 2007/0039049 | A1* | 2/2007 | Kupferman ......... G06F 11/3495 726/22 |
| 2007/0203973 | A1* | 8/2007 | Landauer ............ H04L 12/2697 709/203 |
| 2007/0206741 | A1 | 9/2007 | Tiliks et al. |
| 2007/0226775 | A1* | 9/2007 | Andreasen .......... H04L 63/0227 726/1 |
| 2007/0245420 | A1 | 10/2007 | Yong et al. |
| 2008/0049027 | A1* | 2/2008 | Hauke .................. H04N 7/163 345/502 |
| 2008/0077474 | A1 | 3/2008 | Dumas et al. |
| 2008/0147659 | A1 | 6/2008 | Chen et al. |
| 2008/0288303 | A1 | 11/2008 | Gray et al. |
| 2008/0301081 | A1* | 12/2008 | Karnik ................ G06F 9/44505 706/48 |
| 2009/0049518 | A1* | 2/2009 | Roman ............... H04L 41/0893 726/1 |
| 2009/0119740 | A1* | 5/2009 | Alperovitch ............ H04L 63/20 726/1 |
| 2009/0138592 | A1 | 5/2009 | Overcash et al. |
| 2010/0125911 | A1* | 5/2010 | Bhaskaran ............ G06Q 10/10 726/23 |
| 2010/0146622 | A1 | 6/2010 | Nordstrom et al. |
| 2010/0216509 | A1* | 8/2010 | Riemer ............. H04M 1/72577 455/557 |
| 2010/0250387 | A1* | 9/2010 | Kassaei ................ G06Q 10/00 705/26.1 |
| 2010/0325731 | A1 | 12/2010 | Evrard |
| 2011/0040756 | A1 | 2/2011 | Jones et al. |
| 2011/0075652 | A1 | 3/2011 | Ogura |
| 2011/0138453 | A1 | 6/2011 | Verma et al. |
| 2011/0225650 | A1* | 9/2011 | Margolies ............. G06F 21/554 726/22 |
| 2011/0289308 | A1* | 11/2011 | Sobko .................... G06F 21/56 713/100 |
| 2011/0302656 | A1 | 12/2011 | El-Moussa |
| 2011/0321175 | A1* | 12/2011 | Slater .................... G06F 21/552 726/28 |
| 2012/0023324 | A1 | 1/2012 | Sorensen et al. |
| 2012/0042365 | A1* | 2/2012 | Shoval ................... G06F 21/50 726/7 |
| 2012/0113985 | A1 | 5/2012 | Lee et al. |
| 2012/0117561 | A1 | 5/2012 | Lee et al. |
| 2012/0122566 | A1* | 5/2012 | Bhogal .................. G08B 21/02 463/29 |
| 2012/0137367 | A1* | 5/2012 | Dupont .................. G06F 21/00 726/25 |
| 2012/0216248 | A1 | 8/2012 | Alperovitch et al. |
| 2013/0097701 | A1* | 4/2013 | Moyle ................... G06F 21/552 726/22 |
| 2013/0097709 | A1 | 4/2013 | Basavapatna et al. |
| 2013/0246605 | A1* | 9/2013 | Mahadik ............. H04L 63/1433 709/224 |
| 2015/0106926 | A1 | 4/2015 | Basavapatna et al. |

FOREIGN PATENT DOCUMENTS

| | | |
|---|---|---|
| WO | WO 01/31420 A2 | 5/2001 |
| WO | WO 2008/041915 A2 | 4/2008 |
| WO | WO 2013/059348 A1 | 4/2013 |

OTHER PUBLICATIONS

USPTO Feb. 26, 2013 Nonfinal Office Action from U.S. Appl. No. 13/334,474, 24 pages.
International Search Report and Written Opinion mailed Feb. 22, 2013 for International Application No. PCT/US2012/060652, 7 pages.
USPTO Jul. 2, 2013 Nonfinal Office Action from U.S. Appl. No. 13/334,304, 17 pages.
USPTO Sep. 19, 2013 Final Office Action from U.S. Appl. No. 13/334,474, 30 pages.
USPTO Dec. 16, 2013 Final Office Action from U.S. Appl. No. 13/334,304, 20 pages.
International Preliminary Report on Patentability in International Application No. PCT/US2012/060652, mailed Apr. 22, 2014, 5 pages.
USPTO Jul. 2, 2014 Notice of Allowance from U.S. Appl. No. 13/334,304, 10 pages.
USPTO Oct. 1, 2014 Nonfinal Office Action from U.S. Appl. No. 13/334,474, 27 pages.
USPTO Feb. 2, 2015 Notice of Allowance from U.S. Appl. No. 13/334,474, 8 pages.
Supplementary European Search Report in EP Application No. EP 12 84 2291, mailed Apr. 29, 2015, 7 pages.
Office Action in CN Application No. 201280053565.5, mailed on Jan. 15, 2016, with English translation, 29 pages.
USPTO Jul. 28, 2016 Nonfinal Office Action from U.S. Appl. No. 14/531,881, 18 pages.
Office Action in CN Application No. 201280053565.5, mailed on Jul. 18, 2016, with English translation, 7 pages.
USPTO Jan. 6, 2017 Notice of Allowance from U.S. Appl. No. 14/531,881, 11 pages.

* cited by examiner

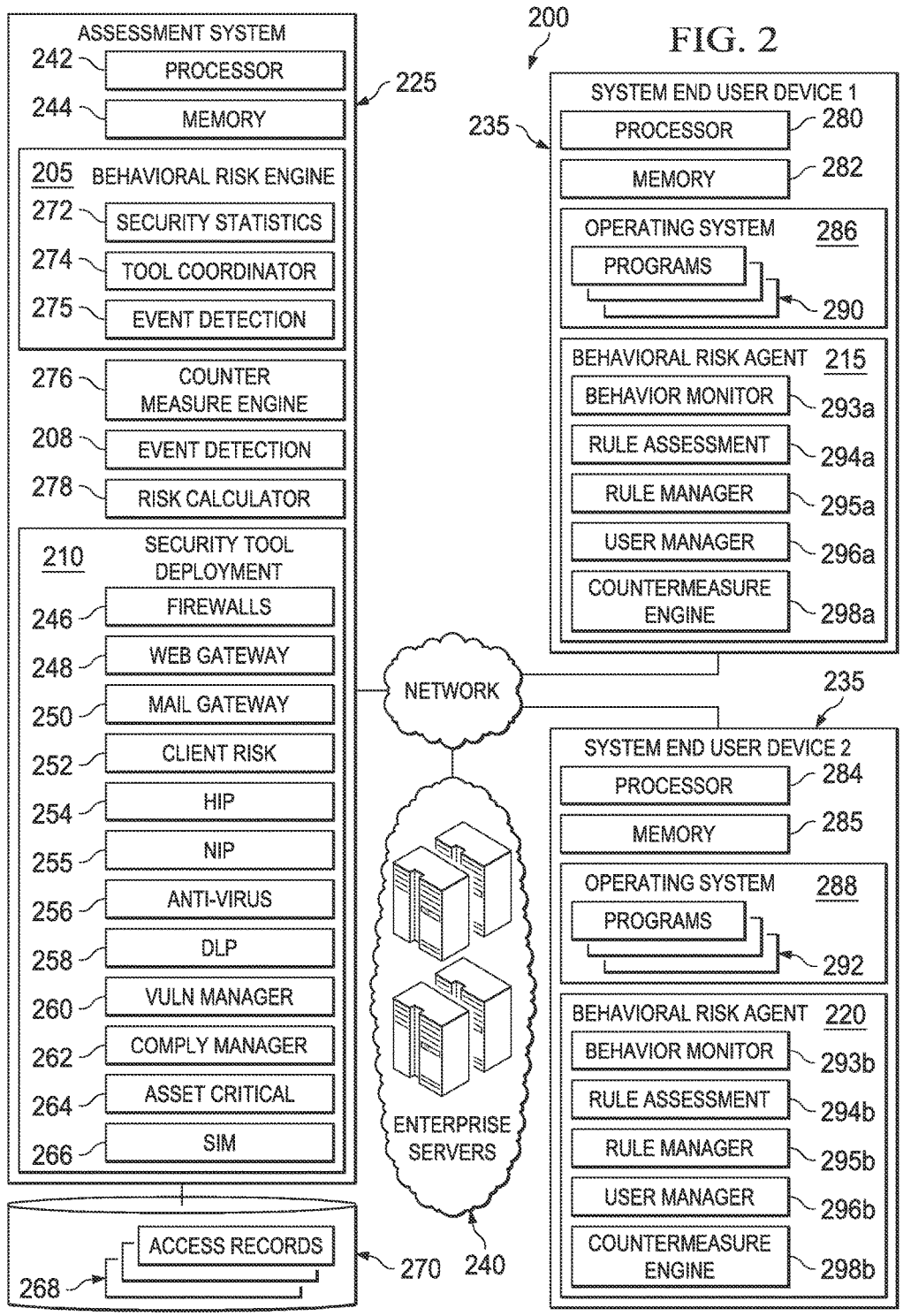

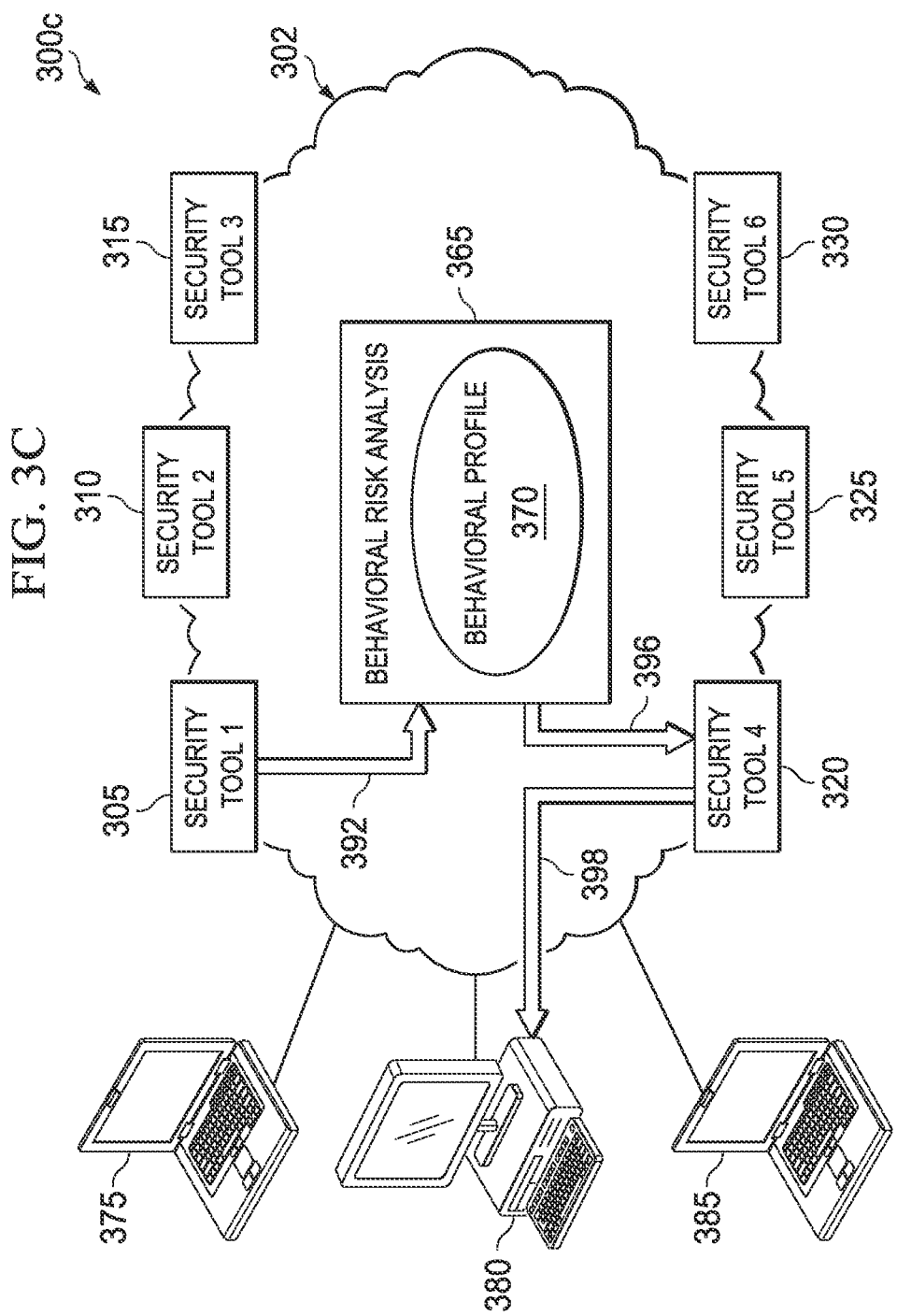

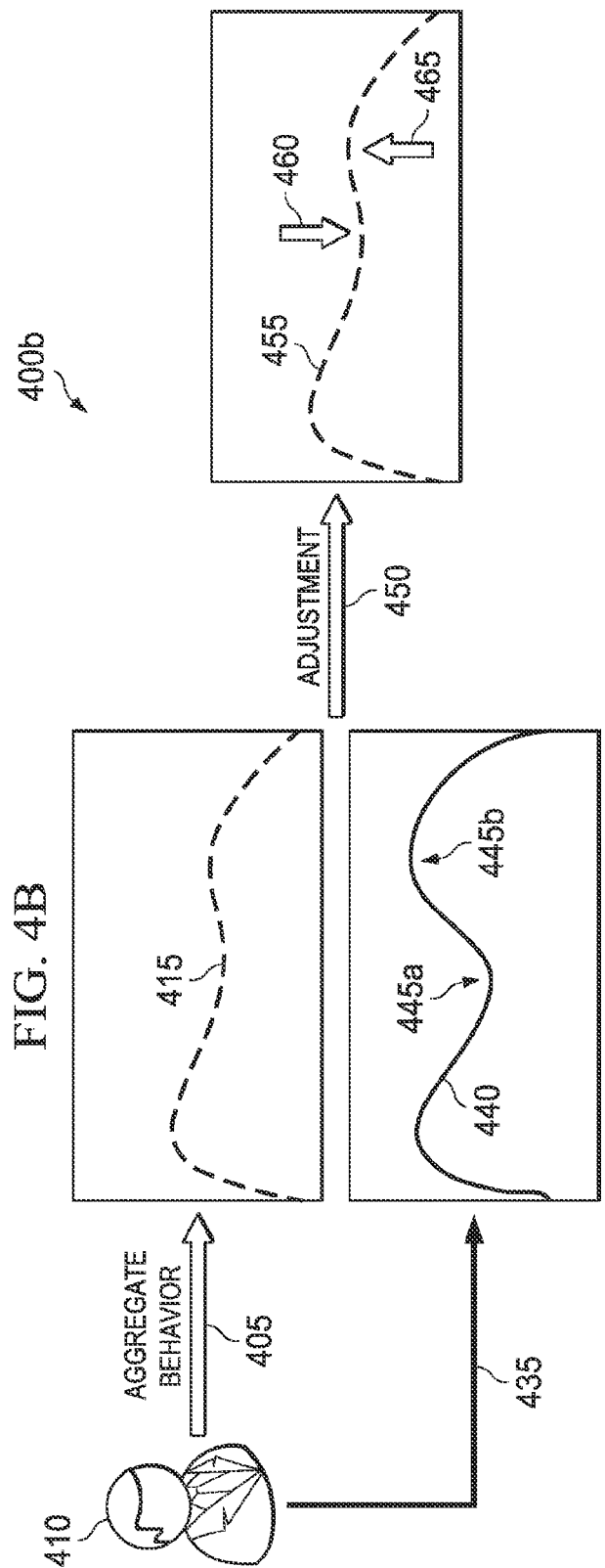

USER BEHAVIORAL RISK ASSESSMENT

RELATED APPLICATIONS

This application is a continuation (and claims the benefit of priority under 35 U.S.C. §120) of U.S. application Ser. No. 13/334,474, filed Dec. 22, 2011, entitled "USER BEHAVIORAL RISK ASSESSMENT," Inventors Michael Mason Moyle, et al., which application claims the benefit of priority under 35 U.S.C. §120 of U.S. Provisional Patent Application Ser. No. 61/548,276, filed Oct. 18, 2011, entitled "USER BEHAVIORAL RISK ASSESSMENT", and U.S. Provisional Patent Application Ser. No. 61/548,292, filed Oct. 18, 2011, entitled "USER BEHAVIORAL RISK ASSESSMENT." The disclosures of each of the prior applications are considered part of (and are incorporated in their entirety by reference in) the disclosure of this application.

TECHNICAL FIELD

This disclosure relates in general to the field of computer security and, more particularly, to risk assessment of computing systems.

BACKGROUND

The Internet has enabled interconnection of different computer networks all over the world. The ability to effectively protect and maintain stable computers and systems, however, presents a significant obstacle for component manufacturers, system designers, computer and network operators. This obstacle is made even more complicated due to the continually-evolving array of tactics exploited by malicious software authors as well as the never-ceasing development of new computing devices and software vulnerable to such threats and others. Risk can be assessed for computing devices and environments and may be based on the vulnerabilities present on the respective computing device as well as threats to which a computing device is exposed. Administrators can utilize risk scores computed for their systems, environments and those persons utilizing those environments and systems to appreciate what types of security weaknesses and risk face the system, together with the amount of risk, and the devices most affected by risk within the system. It is often the human activities that create risk to computer and network systems.

BRIEF DESCRIPTION OF THE DRAWINGS

FIG. 2 is a simplified block diagram of an example system including example behavioral risk assessment modules in accordance with one embodiment;

FIGS. 3A-3C are representations of an example identification of a behavioral risk event using example behavioral risk assessment tools in accordance with at least some embodiments;

FIGS. 4A-4C illustrate examples of assessing behavioral risk against example risk baselines in accordance with at least some embodiments;

Like reference numbers and designations in the various drawings indicate like elements.

DETAILED DESCRIPTION OF EXAMPLE EMBODIMENTS

Overview

Figure 1:
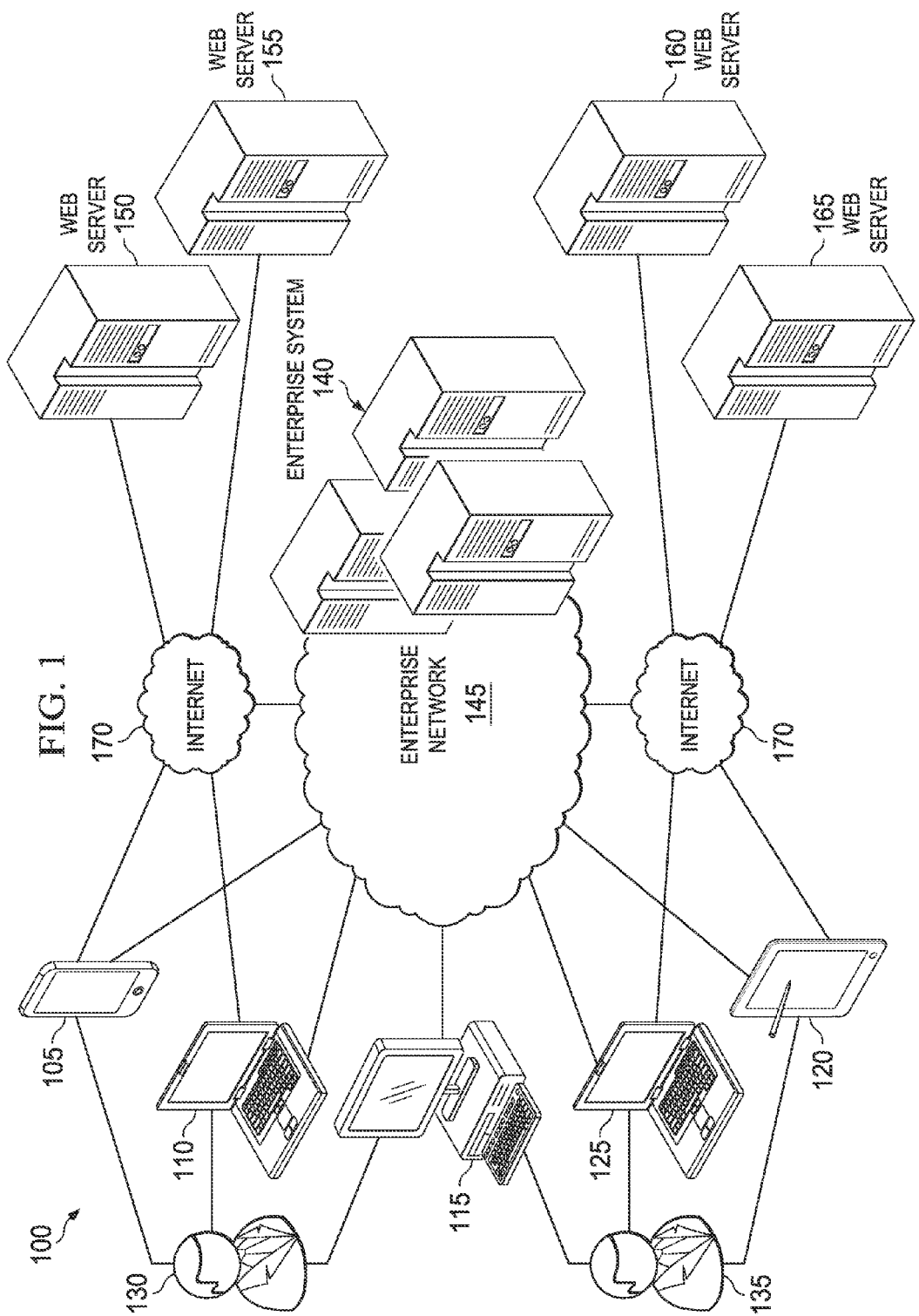
FIG. 1 is a simplified schematic diagram of an example computing system including one or more risk assessment tools in accordance with one embodiment.

In general, one aspect of the subject matter described in this specification can be embodied in methods that include the actions of identifying detection, at a computing device, of a particular activity performed by a particular user using the computing device, determining that the particular activity qualifies as a particular use violation in a plurality of pre-defined use violations, and determining a behavioral risk score for the particular user based at least in part on the determination that the particular activity of the particular user qualifies as a particular use violation.

Further, in another general aspect, a system can be provided including at least one processor device, at least one memory element, and a user behavioral risk analysis tool. The user behavioral risk analysis tool, when executed by the processor, can identify detection, at a particular computing device, of a particular activity performed by a particular user using the particular computing device, determine that the particular activity qualifies as a particular use violation in a plurality of pre-defined use violations, and determine a behavioral risk score for the particular user based at least in part on the determination that the particular activity of the particular user qualifies as a particular use violation.

These and other embodiments can each optionally include one or more of the following features. Determining that the particular activity qualifies as a particular use violation can include determining that the particular activity violates a particular rule corresponding to the particular use violation, the particular rule included in a plurality of rules corresponding to the plurality of pre-defined use violations. The plurality of rules can include an extensible set of rules adapted to be supplemented and modified by user inputs and at least one rule in the plurality of rules can be a user-defined rule. The plurality of pre-defined use violations can include less than all of a set of available pre-defined use violations and the plurality of pre-defined use violations can include a first set of pre-defined use violations identified as corresponding to the particular user. The particular user can be one of a plurality of users including a second user, where a second set of pre-defined use violations corresponds to the second user, the second set of pre-defined use violations does not include the particular use violations, and performance of the particular activity by the second user does not qualify as a use violation. The first set of pre-defined use violations can be identified as corresponding to the particular user based at least in part on at least one of a tenure of the particular user in an organization, a role of the particular user in an organization, a title of the particular user in an organization, a geographical location of the particular user, and a risk profile of the particular user, among other examples. The first set of pre-defined violations can correspond to the computing device, the computing device included in a plurality of computing devices in a computing system. The behavioral score can include sub-scores representing reputation of the particular user in each of a plurality of use categories. The plurality of use categories can include, among other examples, user email use reputation, user Internet use reputation, user authentication risk reputation, user external memory device use reputation, and user shared system resource use reputation. At least one countermeasure can be triggered to counter risk associated with the particular use violation, the countermeasure triggered in response to determining that the particular activity qualifies as the particular use violation. Triggering the countermeasure can include identifying that the particular use violation exceeds a particular threshold. The particular threshold can include at least one of a time-based threshold identifying a length of time of the particular use violation, a repetition-based threshold identifying a number of repeated instances of the particular use violation by the particular user, a time-of-day threshold, and a severity-based threshold identifying a determined severity of the particular use violation, among other examples.

Further, embodiments can include one or more of the additional, following features. A software-implemented agent installed on the computing device can detect the particular activity and send information to a remote user behavioral risk analysis engine describing the detected particular activity. The agent can determine that the particular activity qualifies as the particular use violation and the information sent to the remote user behavioral risk analysis engine can identify the determination of the particular use violation. The user behavioral risk analysis engine can use the sent information to determine that the particular activity qualifies as the particular use violation. The user behavioral risk analysis engine can further use corroborating data received from a security tool monitoring activities of the computing device remote from the computing device to determine that the particular activity qualifies as the particular use violation. An identity of the particular user can be identified in connection with the performance of the particular activity. Detection of a second activity can be identified at a second computing device, the second activity performed by the particular user using the computing device. It can be determined that the second activity qualifies as at least one use violation in the plurality of pre-defined use violations, the behavioral risk score for the particular user further based, at least in part, on the determination that the second activity of the particular user qualifies as at least one use violation. In some instances, the second activity can be detected as having been performed by a second user using the computing device and a second behavioral risk score can be determined for the second user based at least in part on the determination that the second activity qualifies as at least one use violation in the plurality of pre-defined use violations. A behavioral profile can be associated with the particular user describing expected tendencies of the particular user during use of a computing system including the computing device, and determination that the particular activity qualifies as a particular use violation in a plurality of pre-defined use violations can corroborate a determination that other activity on the computing system associated with the particular user deviates from the behavioral profile. Determining that the other activity on the computing system associated with the particular user deviates from the behavioral profile can be determined from feedback data received from at least one security tool monitoring components of the computing system remote from the computing device. The feedback data can be received from an agent installed on the particular computing device, and be based on the particular activity's detection by the agent.

Some or all of the features may be computer-implemented methods or further included in respective systems or other devices for performing this described functionality. The details of these and other features, aspects, and implementations of the present disclosure are set forth in the accompanying drawings and the description below. Other features, objects, and advantages of the disclosure will be apparent from the description and drawings, and from the claims.

Example Embodiments

FIG. 1 is a simplified block diagram illustrating an example implementation of a computing system 100 including a plurality of end user computing devices (e.g., 105, 110, 115, 120, 125) used by any one of a plurality of end users (e.g., 130, 135) associated with an organization. The organization or enterprise can include an enterprise computing system 140 utilizing enterprise computing networks 145, such as local area networks (LANs), virtual private networks (VPNs), wireless local area networks (WiLANs), among others used by the enterprise computing system 140. The end user computing devices (105, 110, 115, 120, 125) can be used within enterprise computing system 140 and enterprise networks 145 (referred to collectively hereafter as enterprise system 140) and can access, modify, create, run, delete, or otherwise use resources of enterprise system 140. Further, in some instances, some devices (e.g., 115) can be accessed and used by multiple users within an organization, for instance, as shared machines that individual users 130, 135 can log-in to and use.

Additionally, end user devices 105, 110, 115, 120, 125 can also be adapted to access other resources, remote from and unaffiliated with enterprise system 140, including web-based applications and resources and services hosted by servers 150, 155, 160, 165 over public networks such as the Internet, or other private networks not associated with enterprise system 140. For example, users within enterprise system 140, in some examples, can access the Internet 170 and web-based resources over enterprise network 145, for instance, while connected to the enterprise system 140 and its network 145. Additionally, in modern enterprises utilizing mobile computing devices such as laptop, tablet, and smartphone computing devices, it is not uncommon for users 130, 135 to use their devices 105, 110, 115, 120, 125 in different environments and away (physically as well as logically) from the enterprise system 140. For example, a work-issued laptop (e.g., 110, 125) can be assigned a user 130, 135 for use within the enterprise system 140. However, at the end of the workday, the issued user 130, 135 may be able to take the device home, connect to private home networks, WiFi hotspots, mobile broadband networks, and the like, and access the enterprise system 140 via, for instance, a VPN connection, as well as use the devices (e.g., 105, 110, 120, 125) for private using, such as web surfing.

In general, "servers," "clients," and "computing devices," including devices used in system 100, can comprise electronic computing devices operable to receive, transmit, process, store, or manage data and information associated with the system 100. As used in this document, the terms "computer," "computing device," "processor," or "processing device" are intended to encompass any suitable processing device. For example, the system 100 may be implemented using computers other than servers, including server pools. Further, any, all, or some of the computing devices may be adapted to execute any operating system, including Linux, UNIX, Windows Server, etc., as well as virtual machines adapted to virtualize execution of a particular operating system, including customized and proprietary operating systems.

Servers, clients, and computing devices (e.g., 105, 110, 115, 120, 125, 140, 150, 155, 160, 165) can each include one or more processors, computer-readable memory, and one or more interfaces, among other features and hardware. Computing devices 105, 110, 115, 120, 125, 140, 150, 155, 160, 165 can include any suitable software component or module, or computing device(s) capable of hosting, serving, accessing, or otherwise making use of software applications and services, including locally-installed, web-based, distributed, enterprise, and/or cloud-based software applications. For instance, servers (e.g., 140) can be configured to host, serve, or otherwise manage web services or applications, such as SOA-based or enterprise web services, or applications interfacing, coordinating with, or dependent on other enterprise services, including security-focused applications. In some instances, a server, system, subsystem, or computing device can be implemented as some combination of computing devices that can be hosted, for instance, on a common computing system, server, server pool, or cloud computing environment and share computing resources, including shared memory, processors, and interfaces.

End user devices 105, 110, 115, 120, 125 can include desktop, laptop, and tablet computing devices, as well as other computing devices such as smartphones, personal digital assistants, video game consoles, internet-enabled televisions, and other devices capable of connecting wirelessly to an at least partially wired network over one or more wireless technologies and protocols. Attributes of endpoint devices 105, 110, 115, 120, 125 can differ widely from device to device, including the operating systems and collection of software programs loaded, installed, executed, operated, or otherwise accessible to the device. A device's set of programs can include operating systems, applications, plug-ins, applets, virtual machines, machine images, drivers, executable files, and other software-based programs capable of being run, executed, or otherwise used by the respective devices (e.g., 105, 110, 115, 120, 125). Other device attributes can also include peripheral devices connected or otherwise accessible to the device, and the types of network technology for which the device is adapted.

Each endpoint device can include at least one graphical display device and user interfaces allowing a user to view and interact with graphical user interfaces of applications and other programs provided in system 100. In general, endpoint devices can include any electronic computing device operable to receive, transmit, process, and store any appropriate data associated with the software environment of FIG. 1. It will be understood that there may be any number of endpoint devices associated with system 100, as well as any number of endpoint devices external to system 100. Further, the term "client," "endpoint device," and "user" may be used interchangeably as appropriate without departing from the scope of this disclosure. Moreover, while each endpoint device may be described in terms of being used by one user, this disclosure contemplates that many users may use one computer or that one user may use multiple computers.

While FIG. 1 is described as containing or being associated with a plurality of elements, not all elements illustrated within system 100 of FIG. 1 may be utilized in each alternative implementation of the present disclosure. Additionally, one or more of the elements described herein may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Different users 130, 135 can make different use of the various devices 105, 110, 115, 120, 125 issued to or otherwise associated with the user. For instance, users can maintain different use habits, such as particular web browsing and electronic communication habits, as well as habits pertaining to supporting security measures on the device (e.g., facilitating scans for malware and vulnerabilities, maintaining strong passwords for the device, etc.) and properly updating of the device (e.g., with latest patches, updates, service packs, etc.). Further, while some users may make use of devices 105, 110, 115, 120, 125 both within the enterprise system 140 as well as outside enterprise system 140 (i.e., within other systems), other users may dedicate use of a particular device for enterprise system 140 use, while dedicating other devices to private use. In short, end user behavior can vary wildly user to user and even include behavior contrary to policies of a particular enterprise. Additionally, a similarly diverse array of devices 105, 110, 115, 120, 125 can be used in connection with enterprise system 140, and these devices 105, 110, 115, 120, 125 can present their own unique attributes, vulnerabilities, and functions that can affect security or risk within an enterprise, especially when combined with the use behavior of different users.

In light of the above, users' (e.g., 130, 135) behavior in connection with an enterprise system 140, or other computing system, including the devices 105, 110, 115, 120, 125 used by the users within the system 140, can affect the security vulnerabilities, threats, and overall risk facing both the users' devices and the system (e.g., 140) at large. In traditional systems, assessment of risk within a system typically turns on an analysis of the vulnerabilities of various devices and components within the system. Such vulnerabilities, however, can be enhanced, originate from, or even be mitigated based on the particular users of the system. Accordingly, in some implementations, user behavior can be considered and included in risk assessments of a computing system using security tools such as those illustrated in the example of FIG. 2.

Turning to FIG. 2, a simplified block diagram 200 is shown of an example system including an example implementation of security and other system and user assessment tools (e.g., 205, 208, 210, 215, 220) adapted to calculate or assess risk associated with user behavior. Such tools, in some implementations, can be provided in connection with or integrated in larger computer security systems, suites, or tools, such as security tool deployment 210 or assessment system 225. Security tools and systems can be provided, in some instances, through or in connection with an enterprise computing environment 240 and be deployed to monitor security, events, and related risk within the environment 240. Other security and event detection tools can run in whole or in part on endpoint computing devices, such as end user devices 230, 235 used within a system of devices, such as an enterprise software environment 240.

Assessment system 225 can be provided that includes one or more processing devices 242 and one or more memory devices 244 used in connection with a behavioral risk engine 205, event detection systems 208, and security tool deployment 245. The security tool deployment 245 can represent individual and parallel-functioning security tools or a suite of security tools, including combinations thereof. For example, security tool deployment 245, in some instances, can include each of one or more firewalls 246, web gateways 248, mail gateways 250, client-based user risk assessment engines 252, host intrusion protection (HIP) tools 254, network intrusion protection (NIP) tools 255, anti-virus and anti-malware tools 256, host-based and/or network-based data loss prevention (DLP) tools 258, vulnerability managers 260, system policy compliance managers 262, asset criticality tools 264, security information management (SIM) products, among other security tools. Security tools (e.g., 246-266) can monitor, scan, and collect data exchanged with, from, to, or within enterprise system 240, including devices, programs, and tools operating in connection with enterprise system 240. Such data collected from the risk and security scans, assessments, data gathering, data correlation, analytics, and other tasks can be stored as assessment records 268 within one or more data structures 270 maintained by the assessment system 225. Further, other events relating to user behavior but not directly tied to the security management or detection within a system, can also be detected and assessment records 268 generated (e.g., using event detection systems 208) for consideration together with data received from security tool deployment 210 and for use in assessing risk associated with user behavior within the system.

Assessment records 268, including or based on data collected using event detection tools 208, security tools 246-266 can be associated with one or more users of enterprise system 240 to develop risk assessments of users' behavior. For instance, user sign-in or other authentication data associated with the user can be identified in connection with actions of a particular device or affecting particular system resources. Further, in some implementations, user identifications (IDs) can be associated with device identifiers, such as MAC or IP addresses used by the devices in the system 240, and actions of a user can be identified based on an identification of the particular device used in the action. Indeed, data can be obtained from a plurality of tools (e.g., tools 208, 246-266) and used to develop a risk/security ("behavioral") profile or assessment of an aspect of a particular user's system use. As an illustrative example, a web gateway 248 and firewall 246, during their respective operation within enterprise system 240 can each collect data respecting a particular user's use of the Internet using enterprise network elements or devices assigned to, registered on, or otherwise used in enterprise system 240. Such data collected from the web gateway 248 and firewall 246 can describe, for instance, a user's attempts to access "red" or "yellow" web sites (or sites known to pose a particular security risk or to be associated with violations of a particular system or enterprise's policy), and serve as at least the partial basis for a risk assessment of the user's behavior on the system 240 (e.g., relating to a user's risky Internet using system infrastructure or devices).

In some implementations, a behavioral risk engine 205 can be included in or otherwise operate in connection with assessment system 225, for instance, in connection with the surveying and analysis of assessment records 268 generated by a plurality of security tools 246-266 performing security tasks and assessments on an assessment system 225, as well as other modules including counter measure engine 276, risk calculator 278, and other modules and functionality. In one particular example implementation, behavioral risk engine 250 can include a security statistics manager 272, a security tool coordinator 274, behavioral risk event detector 275, among other modules and functionality. Security tool coordinator 274 can be used to coordinate data collection from the plurality of security tools 246-266, including identifying security data collected from the security tools 246-266 in assessment records 268. Further, security tool coordinator 274 can function in cooperation with countermeasure engine 276 in launching and accounting for countermeasures realized using security tools 246-266 in response to detecting events relating to particular users' behavior.

Indeed, behavioral risk engine 250 can further include security statistics manager 272 adapted to analyze previously-collected or -generated data from a plurality of security tools 246-266, to perform statistical risk assessments of particular users. For instance, using assessment data 268, security statistics manager 272 can develop one or more behavioral profiles characterizing a user's typical or expected behavior or tendencies within the system based on an aggregation of data describing aspects of the user's previous behavior in the system. Further, in some examples, a behavioral risk profile for a user can include categorical risk profiles or be based on separate risk profiles that are developed characterizing types or categories of user behavior within the system 240, such as email behavior, network usage, access and use of enterprise-owned resources (such as confidential content or data of the enterprise), internet usage using system-affiliated devices, password protection, policy compliance, among others. Further, a composite risk profile or score (e.g., calculated in connection with risk calculator 278) can be generated or calculated for a user based on an aggregation of use- or type-specific user profiles. Still further, groups of users can be identified, such as users within a particular geographic location, office, business unit, demographic group, etc. and group-based risk profiles can be calculated based on an aggregation of risk scores or profiles of users within the respective group. In each instance, events and violations can be detected based on a user's deviation from an associated, statistically-predicted behavioral profile, either for the user, a group to which the user belongs, or all users (e.g., the behavior constitutes something the user doesn't normally do, that users like the user don't normally do, or that any user usually does, etc.).

User events, or events detected at or involving end user devices, evidencing a security event, threat, or other event contributing to or enhancing the risk experienced on a system 240 (collectively, risk events) can be detected, for instance, using risk event detector 275. In some implementations, risk event detector 275 can assess or detect events evidencing a deviation from an established risk profile calculated or otherwise determined for a particular user (or group of users) using security statistics manager 272. Risk events can be further detected from events and activities detected and from data collected at various tools 208, 246-266 in security tool deployment 210. Events and data collected from tools 208, 246-266 can be synthesized or otherwise processed (e.g., through the creation of corresponding assessment records 268) and compared against a corresponding user's risk profile to determine if the detected event rises to the level of a risk event.

Detection of risk events, for instance, using risk event detector 275 can prompt changes to a user's risk profile (e.g., using security statistic manager 272), a user's risk score (even a risk score corresponding to an associated device or the system 240 itself) (e.g., using risk score calculator 278), and/or the initiation of one or more countermeasures to attempt to remedy or mitigate against the detected event (e.g., using countermeasure engine 276).

Device- or host-based security tools (e.g., 215, 220) can also be deployed on devices (e.g., 230, 235) used within system 240 for use in detecting and assessing system risk contributed by the behavior of particular users (i.e., the users of the respective devices 230, 235). In some implementations, behavioral risk agents 215, 220 can include modules such as a behavior monitor 293a-b, rule assessment engine 294a-b, rule manager 295a-b, user manager 296a-b, counter measure engine 298a-b, among other examples. Further, behavioral risk agents 215, 220 can communicate with and function in connection with one or more tools or modules in a backend security system, such as assessment system 225, to perform security and risk assessments of user behavior at the devices used by the users.

End user devices 230, 235, in addition to hosting at least a portion of behavioral risk agent 215, can include one or more processing devices (e.g., 280, 284), and one or more memory devices or elements (282, 285), used in the execution of one or more programs (e.g., 290, 292) on operating systems (e.g., 286, 288). A behavioral risk agent 215, 220 can also be executed on the device, and can be a software program adapted to monitor activities on the device 230, 235, for instance, in connection with behavioral risk assessments. One or more users can log-in to, or otherwise be associated with a device 230, 235, the association identified, for instance, using user manager 296a-b. Based on the identity of the user (e.g., as identified using user manager 296a-b), a set of rules can be identified, for instance, using rule manager 295a-b, that to the identified user and/or particular device being monitored by the behavioral risk agent 215. At least a portion of rule manager 295a-b can be maintained, in some implementations, by a backend security tool, such as client-based user risk assessment backend 252. A database of rule-based, heuristic, and/or behavioral security violations or risk events can be maintained, for instance, using client-based user risk assessment backend 252. A set of rules, potential security violations, or risk events can be based on the identity of the user and depend, for instance, on the identity of the user, including the past use history of the user (e.g., as calculated by security statistics manager 272), the role or responsibilities of the user within the enterprise, the location of the user, and so on. Further, rules, violations, and events can be further based on the particular combination of user and system assets. For example, varying rules, standards, scores, and event triggers can be defined based on particular combinations of users, systems (e.g., computing devices), and network connections, among other examples.

In some instances, rules can be maintained for some users in the system 240 that restrict access or privileges to certain enterprise resources, operations (e.g., creating tunnels into the enterprise network, access to certain trade secrets, human resources (HR) records, customer lists, email attachment size restrictions, etc.) that may not be desirable to enforce against other users, such as executive officers, IT personnel, HR personnel, etc. Indeed, in some instances, rule sets can be applied to defined groups of users, for instance, based on their geographic location, business units, title, pay grade, tenure or seniority in an organization, risk profile or reputation, and so on, so as to not allow rules that apply to one group to interfere with the anticipated legitimate uses of the system by persons in other defined groups. Further, changes to a user's profile can be detected, for instance automatically from HR record data or in response to a user update request, using user manager 296a-b so as to also, dynamically, update the set of rules that apply to the particular user.

Behavior monitor 293a-b can monitor activities on a device (e.g., 230, 235) associated with a particular user and collect data for use in determining whether the monitored activities violate particular rules determined for the particular user. As noted above, rules delineating acceptable uses of a system by a user from unacceptable uses can be at least partially dependent on the detected identity of the device's user. In some implementations, behavior monitor 293a-b can be aware of rules applicable to a particular user (e.g., logged-in to the device) and monitor the user's interactions with the device to detect activities relevant to the rules identified for the particular user. In some instances, the set of rules corresponding to the user (and device) can be loaded, locally, onto the device hosting the respective behavioral risk agent 215, for instance, for access and use by the behavior monitor 293a-b. In other instances, the set of rules for the particular user and/or device can be maintained remote from the device. For instance, rather than providing the end user device 230, 235 with the corresponding rule set itself, a set of tasks, metrics, events, or instructions can be provided (e.g., through rule manager 295a-b) for use by the behavior monitor 293a-b in identifying the types of user and device events, tasks, and activities to be monitored in connection with the detection of potential violations of the corresponding rule set.

To illustrate some of the principles above, in one particular example, a rule included in a particular rule set can dictate the amount of data that can be uploaded from the device to a removable storage medium (e.g., an external hard drive, CD, DVD, Blu-ray disk, thumb drive, etc.) per day (i.e., to protect against data theft). In some implementations, logic can be provided at the behavioral risk agent 215, 220 (e.g., through rule assessment engine 294a-b) to allow the behavioral risk agent 215 to both monitor activities at the device (e.g., using behavior monitor 293a-b), identify rules applicable to the device and its particular user (e.g., using rule manager 295a-b and user manager 296a-b), and assess whether the monitored actions (and corresponding collected data) violate one of the identified rules (e.g., using rule assessment engine 294a-b). In one illustrative example, it can be detected, using various tools (e.g., 208, 246-266), that a particular user has used their computing device, while connected to an enterprise network, to burn twenty CDs worth of data. An event can be triggered based on the detection of this behavior at the device (e.g., 230). Detection of this activity can cause a violation, risk event, or other events to be determined or triggered, either at the device 230 (e.g., using behavioral risk agent 215) or assessment system 225 receiving data reporting the activity, based for instance on this particular behavior being a violation of a pre-defined rule or threshold, a deviation from statistically-anticipated behavior for the specific user, for any user of the particular device, or any user in the system, among other examples.

As implied in the above example, in some implementations, user manager 296a-b can identify the user of the device and rule manager 295a-b can query backend support (e.g., client-based user risk assessment backend 252 or tool coordinator 274) to obtain rule set data for the device, user, or particular device-user combination. Such rule set data, rather than including the rules itself, can include data commensurate with the logic of behavior risk agent 215, 220, such as data defining the types of tasks, functions, and data to be monitored (e.g., using behavior monitor 293a-b). In some implementations, behavior monitor 293a-b can monitor events, data, and user actions and report these actions to a backend module (e.g., client-based user risk assessment backend 252) and allow the backend module to determine the significance of the monitored behavior. In other instances, a measure of logic can be provided at the device 230, 235, such as through rule assessment engine 294a-b, allowing data and events captured by the behavior monitor 293a-b to be at least partially analyzed by the behavioral risk agent 215 in connection with determining whether the monitored behavior violates a particular rule identified for the device and its user. In short, functionality described in connection behavioral risk agent 215 can be modularized and distributed, both among components of the behavioral risk agents as well as between tools operating locally at the end user devices 230, 235 and remote backend security tools (e.g., running in connection with assessment system 225). In some instances, it can be advantageous to provide at least some reporting to backend security tools from the behavioral risk agent 215, thereby allowing reported user behavioral rule violations to be reported for inclusion in the generation of risk assessments, both for the user, the device, and the system, and to provide additional intelligence in connection with the identification of risk events (e.g., detected using event detector 275).

Rule data used by the behavioral risk agent 215 can, in some instances, be stored locally at the device, for instance, in connection with user profile data cataloguing registered users for the device. In other instances, rule data can be loaded dynamically (e.g., by rule manager 295a-b) each time a different user logs-in to the device. Indeed, the amount of functionality that is provided locally at the device (i.e., through a particular installation of a behavioral risk agent) can be based on the capabilities of the particular device (e.g., processing speed, network communication speed, memory, etc.). Further, a set of rules maintained for a particular user of a particular device can be updated dynamically (e.g., using rule manager 295a-b, for instance, pulling updates or receiving pushed updates from a backend service, such as through client-based user risk assessment backend 252). For instance, a change in the device can be detected triggering an update in the applicable rules and event triggers for the device, such as an operating system or application update, a change in the applications or programs installed on the device, the presence of a particular countermeasure, among other examples. Threats motivating the creation of certain rules can also evolve, prompting changes to rules sets. Moreover, users can change, both organically (as their behavior matures or changes naturally) or in connection with changes within the users' status (e.g., such as a promotion, change in department, change in occupation status (e.g., from temp to permanent, or from active to departing, etc.), and so on). Such changes can also be detected and prompt both the dynamic updating of a set of rules corresponding to attributes of the user and device, as well as the communication of these updates through rule data to corresponding behavioral risk agents 215, 220.

In addition to changing, adding, and updating system usage rules and event triggers (used hereindynamically, for instance, based on detected changes on the monitored device or in a user's behavioral profile, other changes can be made based on user inputs and requests, such as from an administrator of the system. Indeed, the set of available rules and triggers (e.g., based on behavioral anomalies detected beyond a particular threshold, or trigger) within a system as well as the particular sub-sets of rules applicable to particular devices and/or users can be extensible sets. As the types and number of vulnerabilities and threats facing computing systems increase, rules and triggers can be added to sets for use in identifying such vulnerabilities as well as user activity within the system that trigger, enhance the risk of, or otherwise relate to such vulnerabilities. Indeed, custom rules and triggers can be defined by users of the system, such as system administrators, in connection with the detection of system specific threats or vulnerabilities known to the system administrators. Accordingly, as new rules and triggers are added, the functionality (and rule and trigger sets information maintained by some implementations) of behavioral risk agents 215 can be similarly extended and modified, in some cases, dynamically in response to a detected update in a corresponding rule set.

Detection of use violations and risk events using behavioral risk agents 215, 220 operating at the end-user-device-level can be used in the formulation of risk profiles, scores, or other user reputation scores. For instance, a user can be identified as violating multiple email-related-rules at one or more devices monitored by behavioral risk agents 215, 220 (e.g., at both a desktop or laptop computing station and at an email-enabled smartphone device), and the user's risk or reputation score can be downgraded as a result. In some instances, using events and violations identified at the device-level using behavioral risk agents 215, 220 can be reported to assessment system 225 for consideration in generating a risk assessment or score for the user. Further, a user's risk score or reputation can be categorized, with distinct risk scores being generated in each of a variety of categories, from the events detected at the device 230, 235 using behavioral risk agents 215, 220, such as separate scores communicating the user's behavioral reputation in email use, internet use, policy compliance, authentication efforts (e.g., password strength), and so on.

Detected rule violations and event triggers at an end user device, corresponding to a particular user (and/or end user device), can also trigger the initiation of countermeasures, both on a system (e.g., 240) or network level, as well as at the end user device level. For instance, countermeasure engine 298a-b can be used to enable, install, or otherwise trigger countermeasures at the end user device 230, 235. Returning for simplicity to the example of monitoring relating to a rule limiting the amount of data that can be uploaded from a machine, in one particular example, identification of a violation of the rule, based on monitoring by behavior monitor 293a-b, can be communicated to countermeasure engine 298a-b and cause a corresponding countermeasure to be applied. For instance, in one example, a violation of the data upload limit rule (or a threshold-based trigger measuring a detected behavioral anomaly) can prompt the countermeasure engine 298a-b to cause a disk drive or USB port to be temporarily disabled (e.g., 24 hours) at the device, among other potential countermeasures designed to slow or stop the uploading of data to removable storage media. Other countermeasures can be launched at an end user device, such as a firewall, disabling one or more network connections, locking the device, requiring re-authentication of the device by a user, among others.

Detection of risk events, whether by risk event detector 275, based on detected departures from statistical profiles or expected user behavior, or based on the detection of a user behavioral rule violation (based on rule-based monitoring by behavioral risk agent 215), can trigger countermeasures to counteract the risk event. While risk events are detected differently in these two approaches (i.e., one based on statistically significant deviations from an expected norm, and others based on explicit rule violations or series of explicit rules violations), detected risk events can be used together to enhance the effectiveness, intelligence, and accuracy of behavioral risk tools. For instance, a behavioral profile can be identified for a particular user and risk events can be detected based on subsequent user behavior that deviates in a statistically significant way from the behavioral profile (e.g., beyond a particular threshold). In the abstract, behavior deviating from what is expecting may raise warning signs that something is amiss. However, a statistical anomaly based on user behavior may not evidence a true security or risk event. However, in addition to identifying a statistical deviation from an established behavioral profile for a particular user, behavioral risk agents 215, 220 can identify rule violations involving the same user and corresponding to the identified deviation from the user's behavioral profile. Accordingly, in some instances, detected deviations from an established user behavioral profile can be correlated to and corroborated with detected rule violations based on monitoring by behavioral risk agents 215, 220. As such, countermeasures, adjustments to the behavioral profile, and other actions triggered from a detected security event can be made with more confidence and accuracy based on the corroboration of a deviation from the behavioral profile with corresponding detected behavioral rule violations. Similarly, additional intelligence can be provided in connection with a detected rule violation based on a corroborating risk event detected in response to an identified deviation from a behavioral profile.

Further, heuristic modeling and analysis can be supplemented by such detected events and the circumstances and attributes connected to the events, to potentially identify reasons or causes of a particular detected event. For example, a deviation from a user's behavioral profile can be detected, for instance, in connection with the user's access of particular system resources. However, based on rules defined for the user (e.g., based on the user's security clearance, or position within the enterprise) the accessing of the resources can be concluded or predicted to be legitimate, even though these actions are statistically abnormal for the user. As countermeasures, including severe and drastic countermeasures, can be triggered based on a detected security threat or risk event, it can be important to identify the circumstances of an identified risk event or security threat so as to properly assess the severity or reality of a risk event and trigger a proportional countermeasure. Indeed, causing a disproportionately heavy-handed countermeasure to be triggered (e.g., based on an incomplete picture of the triggering risk event), such as blocking network traffic or access to devices accessed by a particular device or locking down a machine, among several other examples, can be as troublesome to an enterprise as the perceived threat in some cases. Similarly, serious security threats and risk events need to be detected accurately and dealt with accordingly. As a result, providing both statistical- and rule-based behavioral risk assessments can be particularly valuable in developing a robust and corroborated set of information corresponding to particular events at computing device involving a particular user.

Figure 3A:
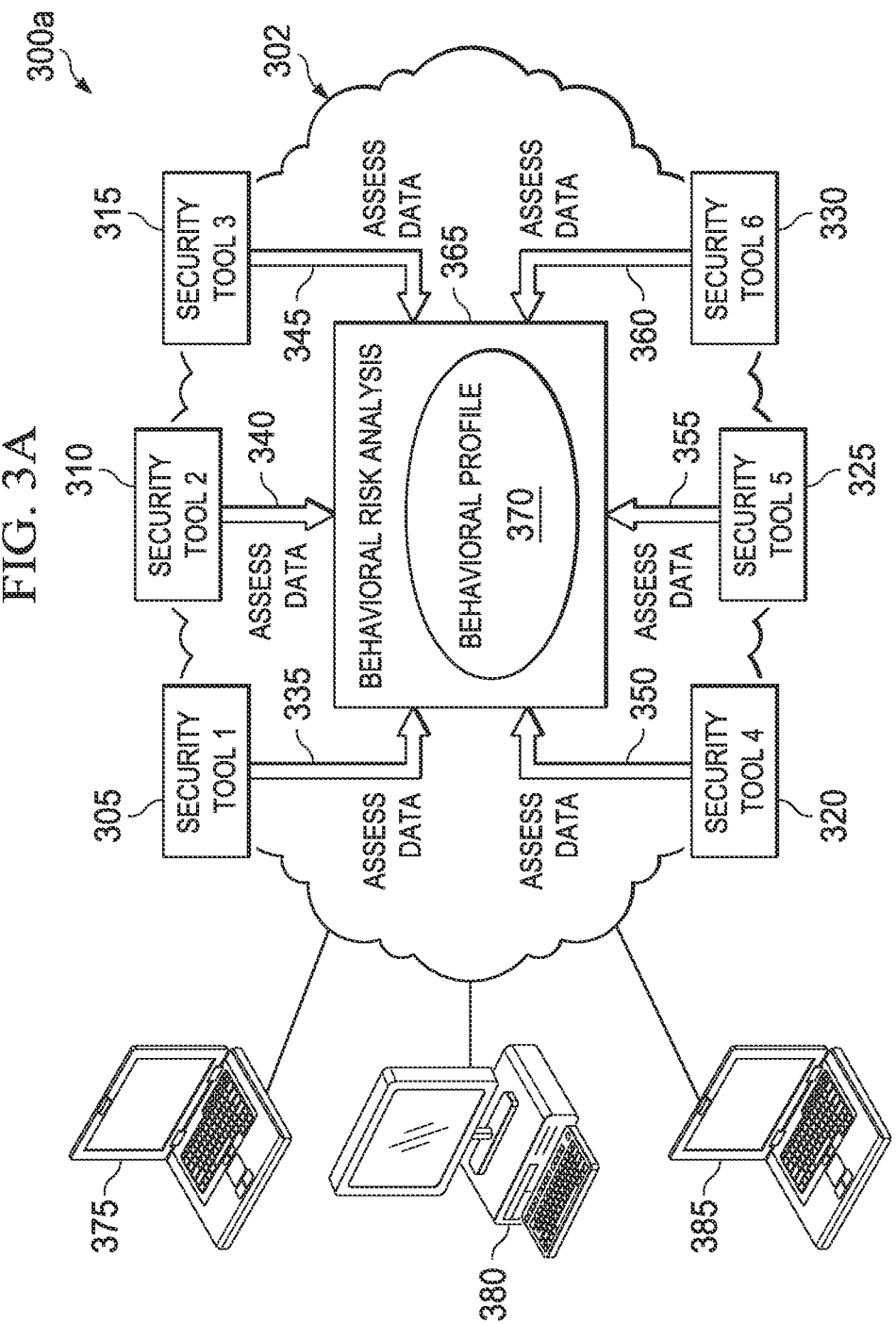
Figure 3B:
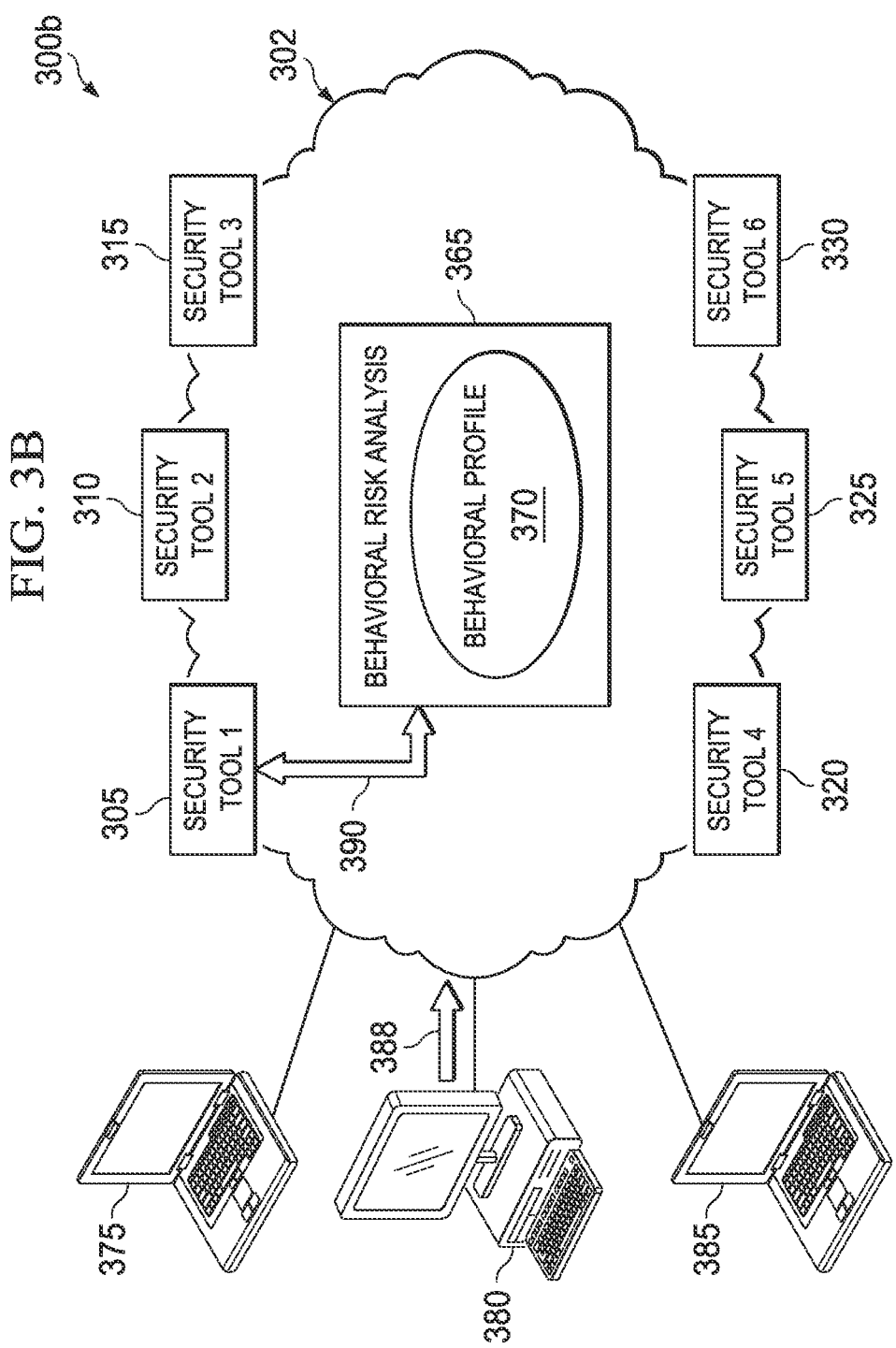

FIGS. 3A-3C are representations 300*a-c* of an example identification of a behavioral risk event using example behavioral risk assessment tools in a computing system 302, such as those shown and described in connection with FIG. 2. Turning now to FIG. 3A, a block diagram 300*a* is shown illustrating a plurality of security tools 305, 310, 315, 320, 325, 330 used to assess risk and perform security tasks with respect to a particular computing system 302. Assessment data 335, 340, 345, 350, 355, 360 can be collected or generated at each of security tools 305, 310, 315, 320, 325, 330 and communicated to a behavioral risk analysis tool 365. Further, users of the system 302 can be identified in assessment data 335, 340, 345, 350, 355, 360 in connection with the events reported by the assessment data 335, 340, 345, 350, 355, 360. For instance, a particular user's use of one or more computing devices 375, 380, 385 within the system can be identified corresponding to events reported in assessment data 335, 340, 345, 350, 355, 360. Accordingly, a behavioral profile 370 can be generated describing statistical trends of a user's behavior within the system 302 based on an aggregation of assessment data 335, 340, 345, 350, 355, 360 collected from the plurality of security tools 305, 310, 315, 320, 325, 330.

Turning to FIG. 3B, security tools 305, 310, 315, 320, 325, 330 can continue to monitor events on the system 302 following the generation of one or more behavioral profiles 370, including events involving or otherwise corresponding to a user's use of a system 302. For instance a user's interaction with or use of system resources (e.g., at 388) using a particular system device (e.g., 380) can be detected by or trigger involvement of one or more security tools (e.g., 305) used in the system 302. Assessment data can be generated in connection with the detected event (e.g., based on user 388), and the assessment data can be used to compare 390 the underlying detected use or activity against the established behavioral profile 370 of the user, as well as to, in some instances, update or otherwise modify the behavioral profile 370 based on this most recent detected activity involving the user. Comparing the assessment data relating to a particular identified user (e.g., of system device 380) can be used to see if the detected use 388 indicates a deviation from the expected behavior of the user (e.g., based on the behavioral profile 370).

Turning to FIG. 3C, an example is shown where a first security tool 305 communicates assessment data 392 to behavioral risk analysis tool 365 relating to a particular user's actions at device 380. Behavioral risk analysis tool 365 can analyze the assessment data 392 against one or more behavioral profiles 370 corresponding to the particular user and determine that a risk event has likely occurred. The determination of the risk event from information provided by one or more security tools (e.g., 305) can be used to trigger a countermeasure to counteract or mitigate against the risk event. In some instances, the countermeasure can be enforced or implemented using the same security tool (e.g., 305) that provided assessment data 392 leading to the triggering of the countermeasure, a different security tool within a security system, or combinations of security tools within a security system. In the example of FIG. 3C, a countermeasure is identified that is proportional to and suitable for addressing a particular security event. Further it can be determined that another security tool 320 possesses at least some of the functionality for implementing the identified countermeasure. Accordingly, behavioral risk analysis tool 365 can request 396 or communicate that the particular countermeasure be implemented using the security tool 320. The request can include parameters indicating how, where, when, and under what additional conditions the countermeasure should be implemented. For example, the countermeasure can be implemented over a temporary period, implemented so as to be focused on the particular user's behavior or particular device 380, among other examples. Accordingly, security tool 320 can apply 398 a countermeasure against the particular user's use of the system. While the schematic diagram 300*c* of FIG. 3C represents the implementation of a countermeasure as being directed specifically at device 380, it should be appreciated that this arrow merely represents that the countermeasure is being applied against or in response to a user's use of device 380 and that the countermeasure, depending on its characteristics and functions, can be logically or physically implemented at other components of the system, including components, such as network elements of the system, remote from the device 380 prompting the countermeasure.

As noted above, a wide and continuously evolving set of risk events can exist and be detectable by behavioral risk analysis tools such as behavioral risk analysis tool 365. Accordingly, a similarly diverse and expansive set of countermeasures can be identified and launched to counteract identified risk events. In some instances, available countermeasures can depend on the set of security tools available or used by a security system as well as the individual functionalities of devices, components, software, and hardware of the monitored the system services by the behavioral risk analysis tool. As but one illustrative example, risk events relating to misuse of system resources through the accessing of particular websites, such as sites identified as potentially risky, of questionable repute, or as known sources of malware can trigger a range of different countermeasures. For instance, routers, internet gateways, anti-malware tools, authentication engines, and other tools and components can possess functionality for filtering, shaping network traffic, restricting or blocking network access, forcing frequent re-authentication, among other countermeasures, including varying degrees thereof.

In some instances, a range of countermeasures may be available for a particular type of risk event, however, it may be desirable to scale or proportion the countermeasures applied against a detected risk event based on a determined severity of the risk event or based on particular conditions that potentially mitigate against the risk or apparent maliciousness of a user's actions. For example, if a deviation from a behavioral profile (e.g., 370) is identified evidencing a particular user's attempts to access red sites, the detected activity may at first be given latitude in terms of qualifying as a risk event and may only be slightly deterred, for instance by requiring more frequent re-authentication to the network (e.g., to verify that the user is indeed the user corresponding the behavioral profile). If the questionable behavior trends continue, more proactive countermeasures can be launched under the assumption that the longer the questionable behavior continues the more likely it is that the behavior is indeed risky or, perhaps, malicious. If intermediate and increasingly severe countermeasures (such as traffic-shaping slowing the user's network connection or more frequent re-authentications to the network) do not nudge the user to cease the behavior on the system, more draconian countermeasures can finally be applied (e.g., as a last resort), such as completely terminating the user's connection, locking the user out of the network for a set period of time, or sending a digital alert to IT personnel to personally intervene. In another example, a range of countermeasures can be applied based on the detected severity of the event itself. For instance, some activities (within a particular category of user system behavior) can be allowed much leeway, while more egregious violations or behaviors being so tightly controlled and countered by deployed countermeasures that the user is practically locked out of the system. Indeed, countermeasures can be applied that are proportionate to the severity (or riskiness) of the detected behavior.

Figure 4A:
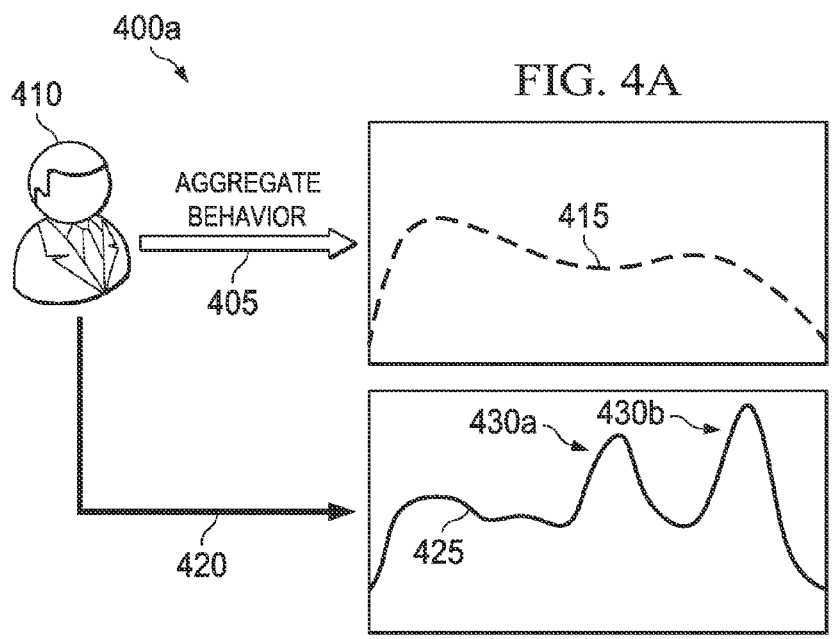
Figure 4C:
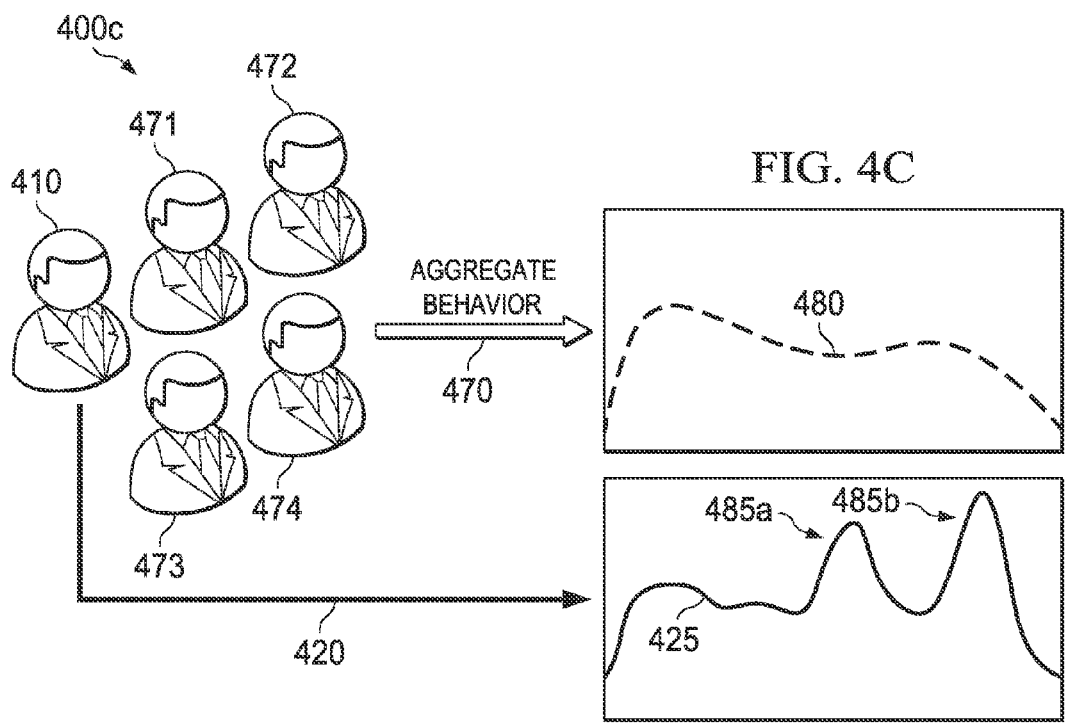

Turning to FIGS. 4A-4C, block diagrams 400*a*-*c* are shown representing the identification of risk events from behavioral profiles or baselines developed for particular users or user groups. For instance, in FIG. 4A, aggregate behavior 405 can be identified for a particular user 410 identified within a particular system, for instance, through a plurality of data and events identified and collected by security tools monitoring devices, transactions, and other aspects of the system that relate to the user's 410 use of the system over a period of time. Accordingly, the aggregate behavior 405 identified for the user 410 can be used to generate one or more behavioral profiles (e.g., 415) for the user 410. As an example, the number and frequency of emails sent by the user through a mail server of the system can be monitored and catalogued to identify trends and patterns in the user's email behavior. Further, more recently identified user activities can be weighted heavier in identifying and characterizing the expected usage tendencies by the user 410 in generated behavioral profiles (e.g., 415) for the user.

User activity 420 relating to a particular, established behavioral profile 415 can be monitored and compared against the behavioral profile 415 to identify whether current usage of the system by the user 410 is in keeping with what is expected for the user. Identifying abnormalities in user behavior can serve as the basis for predicting that a security or risk event is taking place or in danger of taking place in connection with what appears to be abnormal behavior by the user or behavior of a user other than the particular user (e.g., an unauthorized user masquerading as the user). User behavior can naturally deviate from day to day from baseline behavioral characteristics expected of the user and defined in the behavioral profile data 415 of the user. Accordingly, some degree of deviations from the expected behavioral profile 415 can be tolerated so as to permit organic fluctuations in a human user's behavior. Thresholds can be defined for determining whether user behavior diverges in a meaningful or potentially threatening way from the behavioral profile 415 of the user 410. For instance, user actions 420 within the system can be identified and processed to detect that the character of the actions 420 statistically vary or deviate from the expected norm beyond a certain tolerated threshold (such as a number of standard deviations or percentage deviations from the behavioral profile 415). For instance, in the example of FIG. 4A, user behavior 425 identified from monitored actions 420 can be analyzed to identify two spikes (e.g., 430*a*, 430*b*) or deviations from behavioral profile 415 that exceed a predefined tolerated threshold for such deviations. In instances where deviations exceed a tolerated threshold, enhanced monitoring of the user, corresponding devices and activities can be triggered as well as countermeasures triggered based on the detected deviations (e.g., 430*a*, 430*b*).

In one illustrative example, Internet usage behavior (e.g., 405) of a user 410 can be monitored to identify expected Internet usage behavior for the user in behavioral profile 415. For instance, a behavioral profile (e.g., 415) can be developed that shows trends in a user's Internet usage over enterprise system infrastructure over a period of time (e.g., typical daily or monthly use, etc.). Subsequent user behavior (e.g., 420) that deviates significantly from the expected behavioral profile 415 (e.g., 430*a*, 430*b*) can be identified and used as the basis for enhanced monitoring of the user's Internet usage or triggering countermeasure's affecting the user's Internet usage over the enterprise system and devices known to access the enterprise system.

As shown in FIG. 4B, other actions 435 identified for a user 410 of a system can be compared against corresponding behavioral profile data 415 (including behavioral profiles identified as corresponding or relevant to the type of actions identified) to determine that the user's behavior falls within tolerances of behavior corresponding to what is expected from the user 410 based on the behavioral profile 415. In some instances, identifying that user actions 435 generally comport with behavioral profile data 415 for the user 410 can prompt no action by the system and corresponding behavioral risk analysis tools. In other instances, identifying user action 435 can result in fine-tuning, modification, or adjustment (i.e., 450) of the behavioral profile 415. For instance, one or more user interactions 435 with the system can be identified and support a determination that a previously-determined behavioral profile (either for a user or group of users) be changed based on the newly-received interactions. In other words, as additional user behavior is detected by the system that relates to a previously-generated behavioral profile 415, the behavioral profile can be changed to reflect this additional intelligence.

In the example of FIG. 4B, user actions 435 in a system are identified and compared against behavioral profiles (e.g., 415) for the user. From the comparison it can be determined that the user's immediate behavior (e.g., 440) deviates (e.g., at 445a-b) from behavioral profile 415, but within the threshold tolerances allowed by the system. Further, based on the detection of deviations 445a-b (or a recurring pattern of such deviations 445a-b), the behavioral profile 415, itself, can be modified, updated, or adjusted 450 (e.g., at 460, 465), to reflect the tendencies of the user reflected in behavior 440.

Turning to FIG. 4C, as noted above, behavioral profiles can be generated for groups of users (e.g., 410, 471-474), such as from the aggregate monitoring of actions 470 of users in the group. For instance, groups can comprise business units or departments, geographies (e.g., by country), employment status, among other conceivable groupings of people within a system's organization. Indeed, in some instances, a group can comprise all users registered or known within a system. In still other examples, a group can include non-registered system users, such as guest users of the system. While monitoring actions on a system (e.g., at one or more security tools monitoring the system), actions detected during the monitoring can be associated with particular users, the identity of the user allowing the actions to be further associated with groups including the user. Accordingly, a plurality of detected actions can be associated with groups and be used to generate a group-based behavioral profile 480 from the collected actions (e.g., 470).

As in the example of FIG. 4A, a particular action 420 (or set of actions) by a particular user (e.g., 410) identified in the group can be identified exemplifying behavior 425 that deviates (e.g., at 485a, 485b) from the behavioral profile 480 for the group. Indeed, a user's behavior 425 can be identified as deviating beyond a specified threshold for deviations from the behavioral profile 480. Further, a particular user's activities 420 can be identified as a violation or deviation of a plurality of different behavioral profiles (e.g., 415 and 480), including a plurality of user-based behavioral profiles (e.g., 415), a plurality of different group-based behavioral profiles (e.g., 480), or combinations of both user-based and group-based behavioral profiles. Additionally, where user actions (e.g., 420) and behavior (e.g., 425, based at least in part on action 420) deviate from multiple behavioral profiles, the behavior can deviate in different ways and for different reasons from the respective different behavioral profiles. Still further, the riskiness or seriousness of a user's behavior 425 as well as a security system's response to the detected deviations (e.g., 430a, 430b, 485a, 485b), such as the type and severity of countermeasures launched in response to the behavior 425, can be based on the fact that particular behavior (e.g., 425) violates multiple different behavioral profiles (e.g., 415, 480). In other instances, deviations from multiple different behavioral profiles can be dealt with independently by the security system.

While the examples of FIGS. 4A-4C represent behavioral profiles using diagrams 415, 455, 480, it should be appreciated that these diagrams are merely provided as illustrative examples and do not necessarily represent actual embodiments of behavioral profiles. Additionally, the examples of FIGS. 4A-4C should be generally understood as non-limiting, illustrative examples. While examples above described an example behavioral profile that tracks a user (or group of users') tendencies within a given time period (such as patterns of average observed email or Internet traffic involving the user over the course of a day or week), a variety of different behavioral profiles can be generated and maintained for users of a system, including customized behavioral profiles adapted to the particular security risk and concerns of a given system (e.g., as defined by the system's administrators). As examples, a behavioral profile can describe the types or identities of websites typically accessed by a user, the average range of email attachment sizes sent (or downloaded) by the user, the system resources (e.g., shared drives, files, databases, etc.) typically accessed by the user or group of users, among potentially limitless additional examples.

Figure 5A:
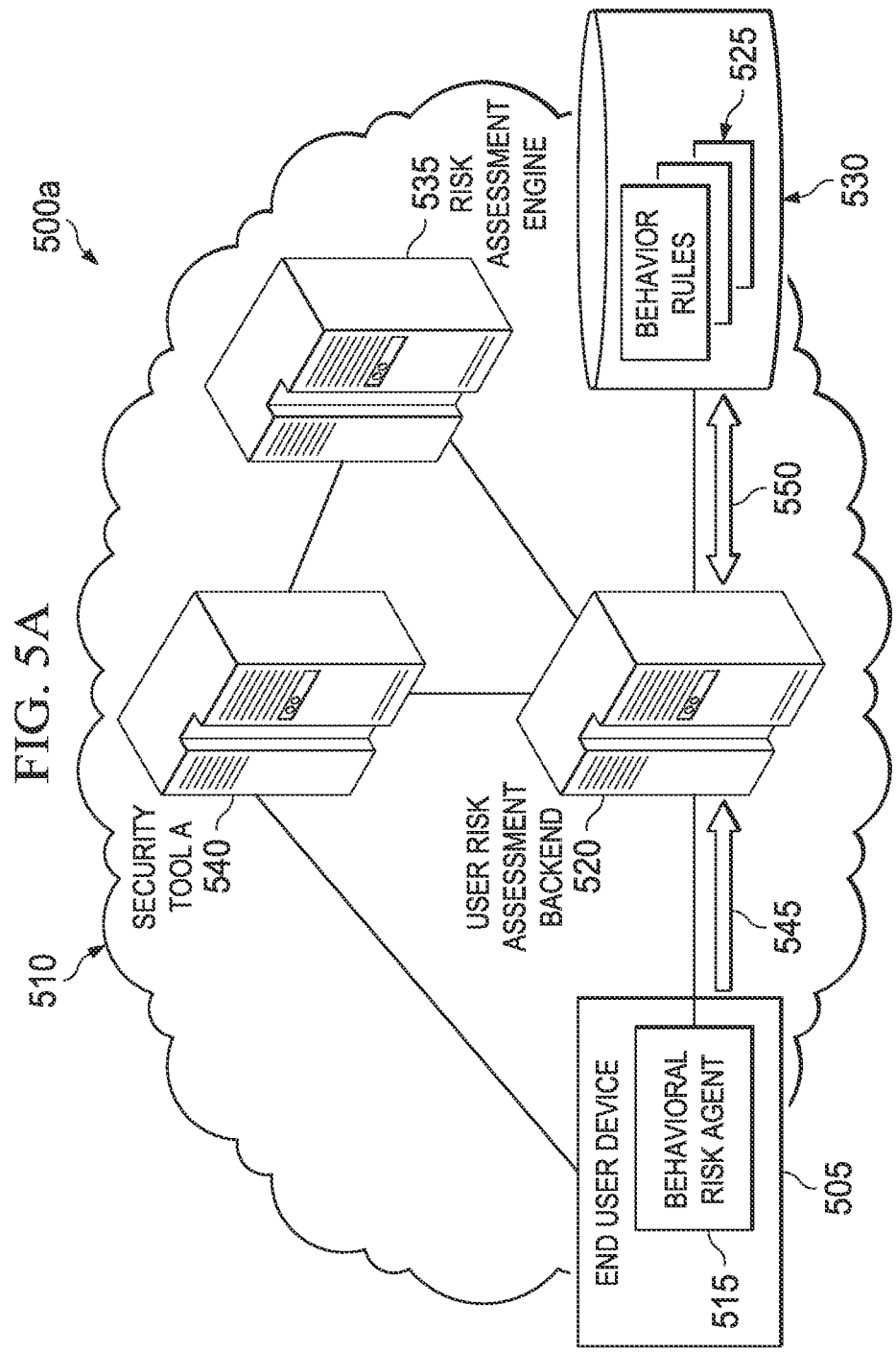
FIGS. 5A-5B are representations of example tasks performed by an example client-based behavioral risk agent in accordance with at least some embodiments.
Figure 5B:
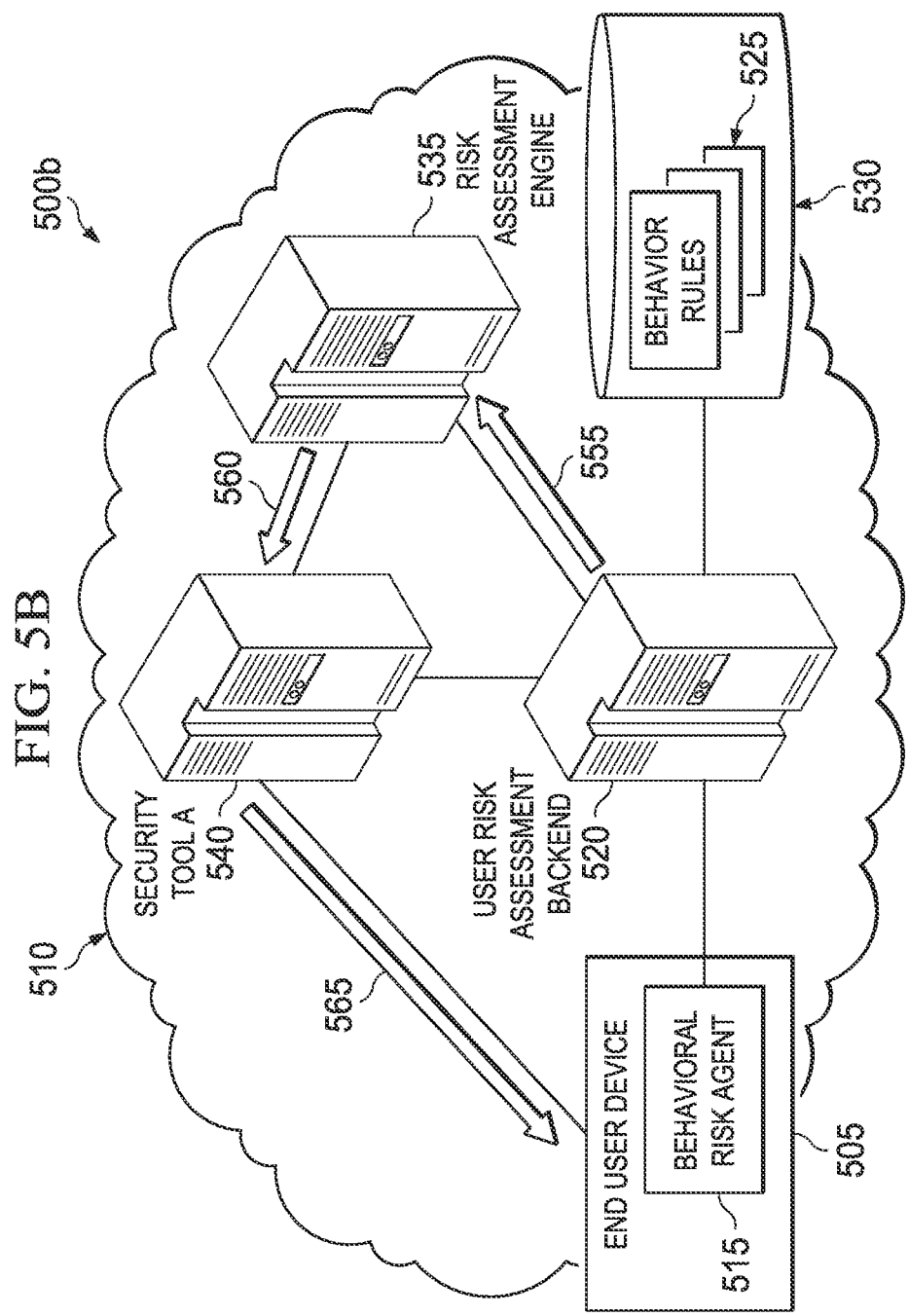

Turning now to FIGS. 5A-5B, schematic representations 500a-b are shown illustrating interactions of system components in connection with monitoring of user behavior at host- or end-user-devices used by a particular user. For instance, in FIG. 5A, an end user device 505 on a system 510. The end user device 505 can include a behavioral risk agent 515 loaded, installed, or otherwise available to the end user device 505. The behavioral risk agent 515 can operate in connection with one or more back end services or components, such as user risk assessment backend 520. Risk events alerting a system of particular risky behavior detected at any one of a plurality of end user devices, including end user device 505, can be based on predetermined user behavior rules 525, for instance, maintained in one or more data structures or data stores (e.g., 530). A subset of the user behavior rules can be applied against a particular device (e.g., 505) based on a detected identity of the user currently using the device. The subset of behavior rules can be identified, for instance, based on a determination that certain rules are relevant to or apply to the particular user based, for instance, on the user's role, access rights, behavioral profiles (such as behavioral profiles generated consistent with the examples of FIGS. 4A and 4C). The subset of user behavior rules applied against a particular device (and user) can be further identified and determined based on the behavioral rules' applicability to a given device. For instance, use behavior rules relating to user Internet access and usage may be disregarded in monitoring of devices where Internet connectivity is unavailable or disabled.

In the example of FIG. 5A, behavioral risk agent 515 can monitor and detect certain user-initiated activities at the device 505, such as according to rules 525 identified for the user, and communicate 545 the detection of the activities to user risk assessment backend 520. In some implementations, behavioral risk agent 515 can be provided with logic to compare 550 the activity against applicable rules 525 and make at least a preliminary determination that a rule (e.g., from 525) may have been violated based on the activities identified at the behavioral risk agent 515. Indeed, in such instances, behavioral risk agent 515 can simply communicate (e.g., at 545) a detected rule violation to the user risk assessment backend 520 for use by the user risk assessment backend 520 in triggering corresponding countermeasures or defining or updating of a risk profile, score, or reputation for the device's (i.e., 505) user. In other instances, user risk assessment backend 520 can process the communication 545 of the identified activities and perform at least a portion of the check 550 of the detected activities against rules 525 to identify, corroborate, or confirm a violation of the rules 525. Indeed, in either implementation, user risk assessment backend 520 can generate or update a user risk profile, score, or reputation based on an identified rule violation.

In addition to identifying activities that violate rules 525 as well as rule violations themselves, behavioral risk agent 515 can also identify and report seemingly benign user activities identified at the device 505. Such information can also be used, for instance, to provide context for the frequency of rule violations by the user. For instance, reporting of benign user activities can communicate an indication of how much user activity takes place between detected rule violations. For instance, a user's reputation or risk score can be determined, at least in part, based on the frequency of risk events or behavior rule violations by the user.

Turning to FIG. 5B, user risk assessment backend 520 can communicate and operate cooperatively with one or more other security tools in connection with events and activities detected using behavioral risk agent 515 at end user device 505. For instance, in some implementations, in response to receiving a communication (e.g., 545) of a detected rule violation (or activities determined to violate one or more rules 525), user risk assessment backend 520 can communicate 555 the occurrence of the rule violation to a risk assessment engine (e.g., 535) that can utilize feedback data from a plurality of security tools, including user risk assessment backend 520, to determine a composite risk score or assessment of a particular user. In some instances, user risk assessment backend 520 can generate reputation scores for users (i.e., based on feedback from behavioral risk agents (e.g., 515)) that are distinct from composite risk assessments generated based on data from a plurality of security tools (e.g., 540), including security tools (e.g., in security tool deployment 210 of FIG. 2) operating remote from and/or monitoring system components remote from the end user devices 505 actually used by the system's 510 users. Indeed, a reputation score generated for the user from feedback received from behavioral risk agents can be factored into a composite risk assessment generated for the user.

In other implementations, risk assessment engine 535 can also generate risk scores based on feedback from behavioral risk agents (e.g., 515) operating on end user devices (e.g., 505) on the system 510. Indeed, in some alternate implementations, behavioral risk agents (e.g., 515) can communicate directly with risk assessment engine 535 in connection with the generation of risk scores for a user and the launching of countermeasures responsive to detected rule violations (i.e., in implementations where behavioral risk agents 515 are equipped with logic allowing for not only the detection of activities on end user devices but a determination of whether the detected activities violate one or more rule 525).

In connection with the identification of a rule violation, based on device activities identified by a behavioral risk agent (e.g., 515), risk assessment engine can determine one or more countermeasures (e.g., 565) to launch to counteract the detected violation. In some instances, the countermeasure 565 determined to be responsive to an identified rule violation can be provided by security tools (e.g., 540 remote from the end user device 505). In some implementations, a centralized risk assessment engine (e.g., 535) coordinating multiple security tools within a system 510 can broker the triggering of countermeasures based on events identified using behavioral risk agents. In other implementations, using behavioral risk agents 515 with more robust logic and feature sets, behavioral risk agent 515 can participate in the triggering of countermeasures responsive to an identified rule violation. This can include the behavioral risk agent 515 being used to communicate with other security tools (e.g., 565) as well as launching countermeasures on the end user device 505 itself. For instance, a rule violation relating to a user exceeding a permitted number of uploads to removable storage media (e.g., CDs, thumb drives, etc.), can be counteracted by behavioral risk agent 515 triggering a countermeasure that disables use of a CD drive, USB drive, etc. on the device 505.

Risk assessment engine 535 can also be equipped to handle data identifying behaviors at end user devices 505 to develop, fine-tune, or otherwise manage rules, triggers, and statistical baselines based on aggregated behaviors of multiple users across a system (e.g., as described, for instance, in connection with FIG. 4C). Data communicated from end user devices (e.g., 505) (for instance, via user risk assessment backend 520) can be applied to and affect existing rules, triggers, as well as other statistical measures to influence how the reported behavior, as well as subsequently detected and reported behavior (e.g., at end user device 505 or other systems (e.g., security tool 540)) will be handled).

Figure 6:
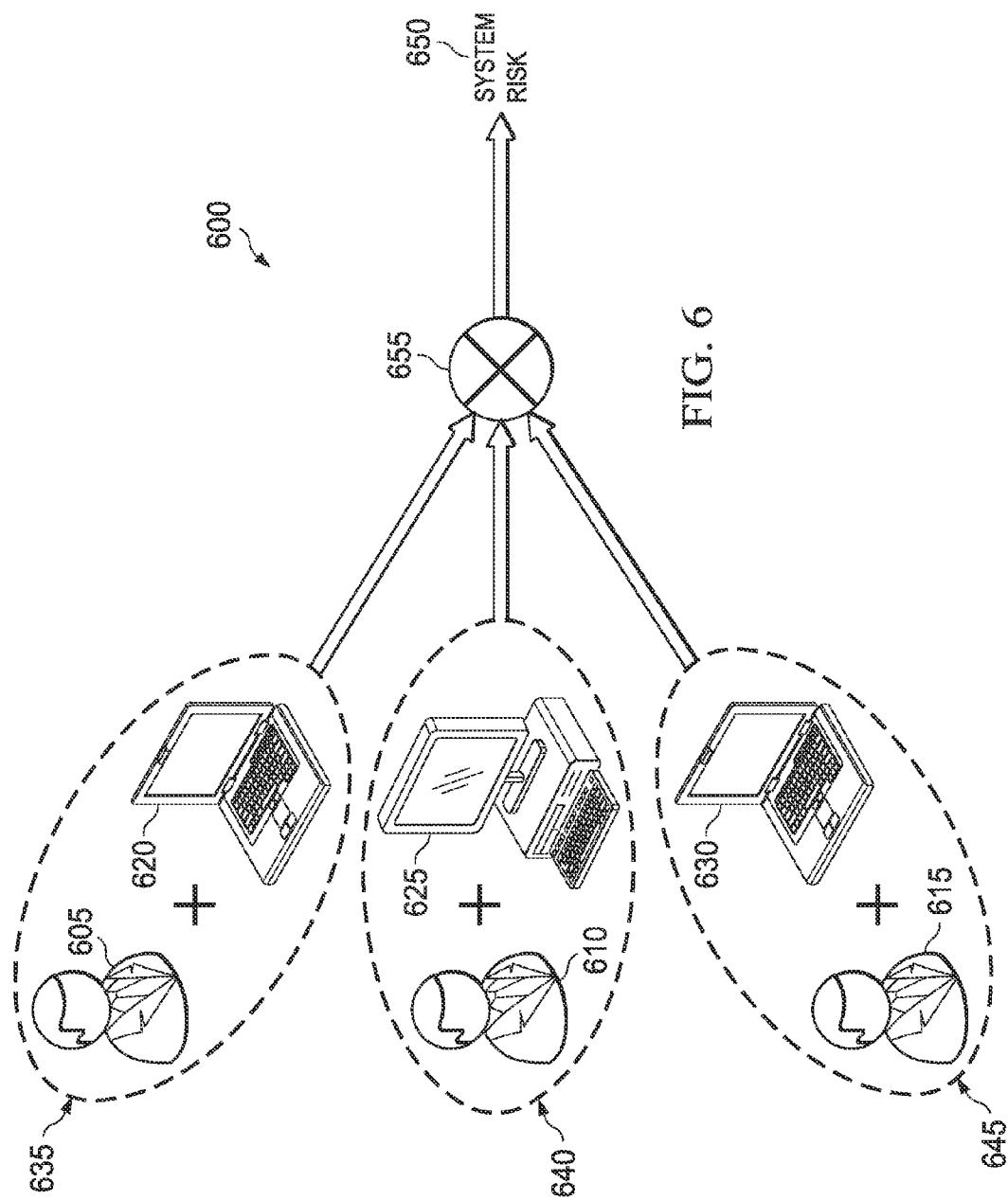
FIG. 6 is a representation of a composite risk assessment considering behavioral risk within a system in accordance with at least some embodiments.

FIG. 6 includes a representation 600 of a composite risk assessment considering behavioral risk within a system. As noted above, risk scores can be generated for each of a plurality of users (e.g., 605, 610, 615) on the system. Users' scores can be based on the users' 605, 610, 615 respective uses of devices 620, 625, 630 on the system. Further, as noted above, risk scores can be generated or calculated for each of the devices (e.g., 620, 625, 630) on the system. Composite risk scores 635, 640, 645 can be generated based on identified associations between users and devices in the system. For instance, it can be identified that a particular device (e.g., 620), having a first device risk score, is assigned or being used by a particular user 605 having a first user risk score. A composite risk score 635 can be generated for the user (605)-device (620) combination based on the particular user's 605 use of the particular device 620. For instance, a device's 620 risk profile can be based on particular vulnerabilities detected at the device 620. The riskiness of the device's 620 use within the system can be enhanced by a particular user's use of the device 620. Indeed, depending on the behavioral tendencies of one user relative another user, the use of a particular device by the one user can be riskier (i.e., to the system) that use of the same device by the other user. For instance, a particular user's risk profile can indicate that they are likely to use device 620 in such a way that makes the introduction of threats or exploitations of the device's 620 vulnerabilities more likely than during use by another user or even an average hypothetical user. For instance, correlations can be identified between factors contributing to device's 620 risk score and factors contributing to user's 605 risk score. Such identified correlations can be used to determine that the particular device-user combination enhances the riskiness of the device (or user) or even, in some instances, decreases the riskiness of the device or user. For instance, a user 605 whose risk score is based on the effects of the user's 605 perceived proclivity to engage in risky online activity using an average hypothetical device, may be determined to be less risky when the user 605 is utilizing a device with particular functionality, tools, or countermeasures employed that counteract the user's 605 risky behavior. Alternatively, the risk to a system of a device with relatively low firewall or malware protection can increase when used by a user with a proclivity to engage in risky online activity. Indeed, the deployment of particular security tools or countermeasures on a device's (e.g., 620, 625, 630) can be considered in the risk score or profile determined for a device.

Continuing with the description of principles illustrated in the representation 600 of FIG. 6, composite risk profiles 635, 640, 645 can be generated for each device-user combination discovered on the system. It should be noted that users can be associated with multiple different devices and devices can be associated with multiple users, such many-to-many relationships also being reflected in generated composite risk profiles for the various device-user combinations. Further, a system or sub-system composite score 650 can be generated based on an aggregation or calculation considering a plurality of device-user composite risk scores (e.g., 635, 640, 645). By incorporating assessments of the riskiness of devices based on the relative riskiness of their corresponding users, an overall risk profile 650 determined for a set of devices or a system-at-large can more accurately reflect the risk present on a system than if risk were assessed based on user behavioral risk independent from device risk.

Figure 7A:
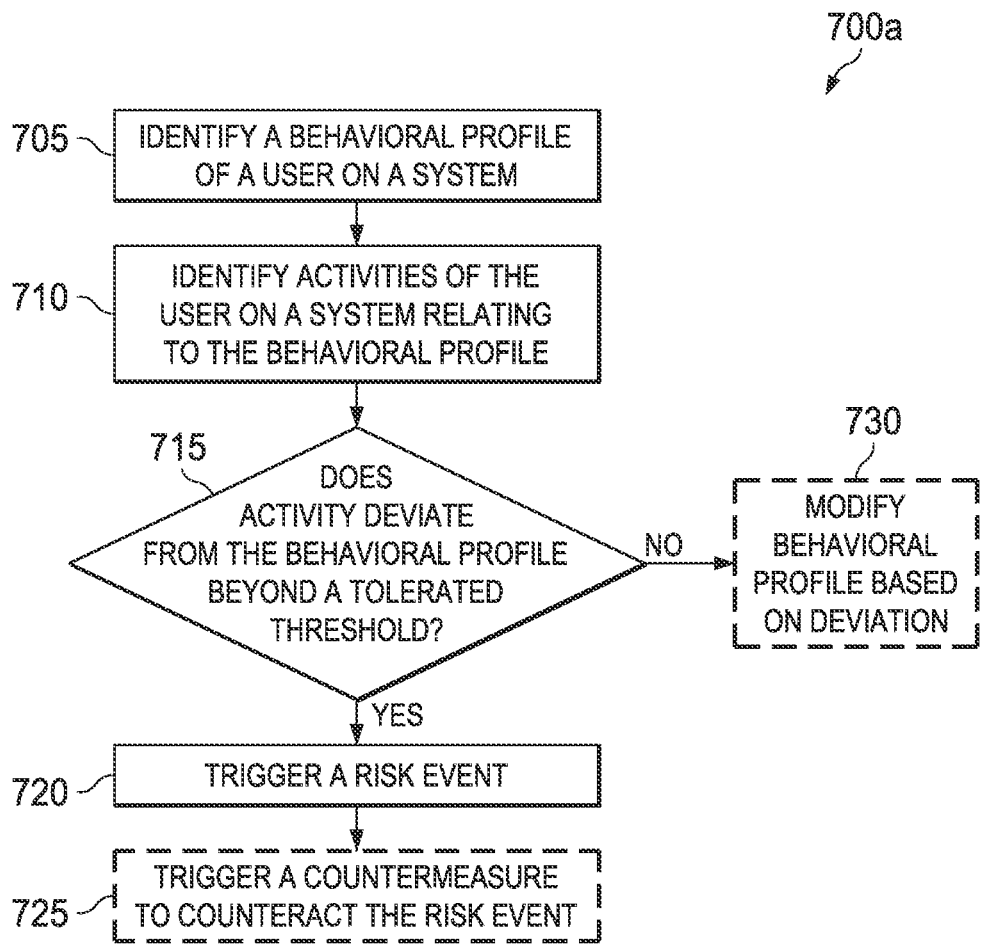
FIGS. 7A-7C are simplified flowcharts illustrating example operations associated with at least some embodiments of the system.

FIG. 7A is a simplified flowchart 700a illustrating an example technique for identifying a deviation from a behavioral profile of a user of a system. An existing behavioral profile can be identified 705 that applies to a particular user of the system. The behavioral profile can correspond to the particular user as an individual user or to a group of system users to which the particular user belongs. The behavioral profile can be generated based on assessment data received from a plurality of remote security tools monitoring security conditions of the system and adapted to identify data relating to prior activities of the particular user on the system. Further, activities of the user can be identified 710, for instance, by these same security tools, and the identified activities can be identified 710 as relating to the identified behavioral profile. It can be determined 715 whether the identified activities of the user deviate from the behavioral profile beyond a particular tolerated threshold for such deviations. If it is determined 715 that the identified activity deviates from the behavioral profile beyond the tolerated threshold, a risk event can be triggered 720 relating to the deviation. Further, in some instances, a countermeasure can be triggered 725 to counteract the detected risk event (e.g., at 720). In the event the activity is determined 715 to deviate minimally or otherwise within the tolerated threshold from the behavioral profile, the activities can be ignored. In some instances, the behavioral profile can be modified 730 based on the identified deviation from the behavioral profile. Indeed, deviations beyond the tolerated threshold for the identified behavioral profile can also result in modification of the behavioral profile to better reflect the most-recent behavior of the user.

Figure 7B:
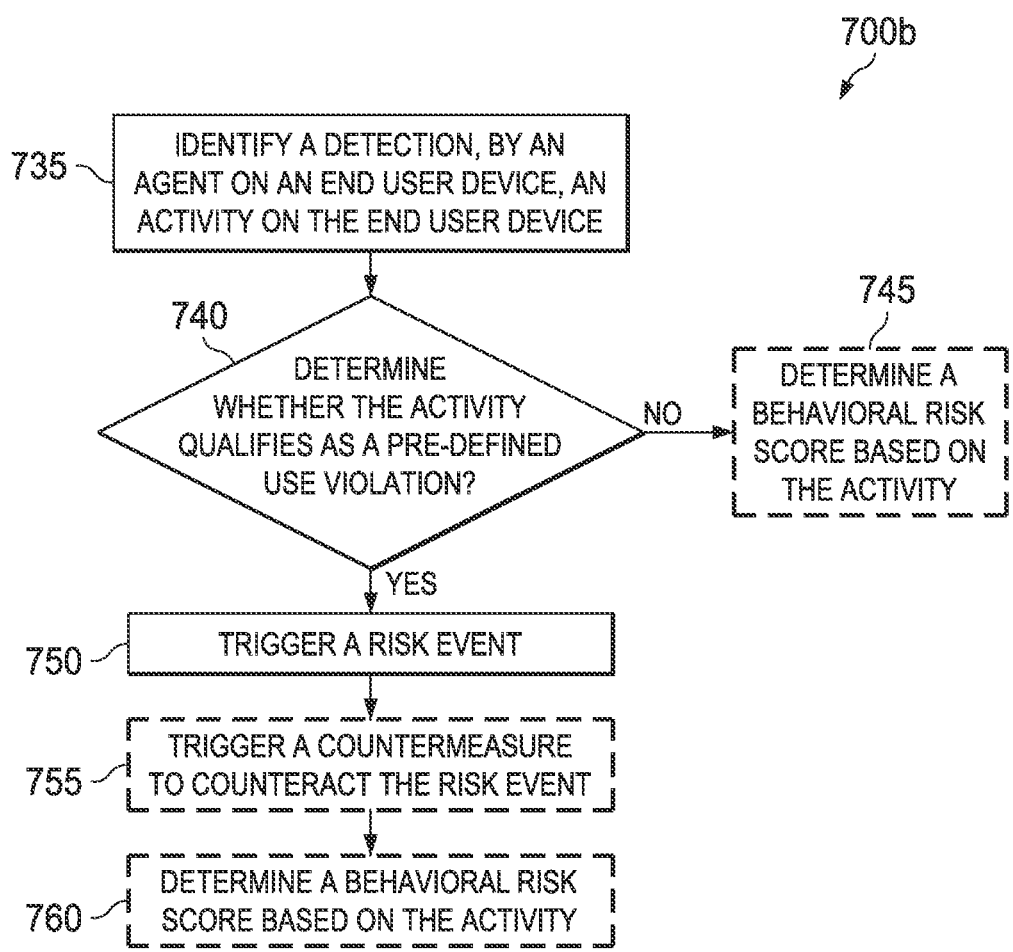

FIG. 7B is a simplified flowchart 700b illustrating an example technique for detecting system use violations at an end user device associated with a particular user of the system. Activities performed by the particular user on the end user device can be detected by an agent installed on the end user device and monitoring activities on the end user device (e.g., in connection with a set of system use rules corresponding to the device and/or the particular user). The detection of such events can be identified 735, for instance, by the agent itself or by remote and/or backend support components that receive an identification of the detected activity from the agent. It can be determined 740, using one or both of the agent and backend support components, whether the detected activity qualifies as a pre-defined use violation. If it is determined 740 that the detected activity qualifies as a pre-defined use violation, for instance, due to the detected activity's violation of a particular system usage rule, a risk event can be triggered 750. As in the example of FIG. 7A, in some cases, identification of a risk event (e.g., at 750) can trigger 755 a countermeasure to counteract the risk event. Identification of the risk event (e.g., at 750) can also be considered in the determination (or updating) 760 of a behavioral risk score for the user. Alternatively, if it is determined that the detected activity does not qualify as a use violation, the activity, in some cases can be ignored, while in other cases, the activity is used in the determination (or updating) of a behavioral risk score for the user.

As noted above, tasks included in the techniques illustrated in flowcharts 700a and 700b can be at least partially combined, for instance, to corroborate detected risk events. For instance, as shown in the flowchart 700c of FIG. 7C, user activities can be identified (e.g., at 710, 735) and compared (e.g., 715) against an established behavioral profile corresponding to the user or against a set of system usage rules or pre-defined system use violations (e.g., at 740). Further, a determination that an identified activity (e.g., detected at security tools monitoring remote from or downstream from the user's end user device) deviates from the behavioral profile can be compared 765 with identified use violations based on activities detected at the end user device by an agent installed on the end user device. If a correlation is identified (e.g., at 765) between the identified deviation from the behavioral profile and a detected use violation at the end user device, additional confidence can be ascribed to a determination that the detected activities correspond to a substantive risk or security event, thereby triggering 770 identification or determination of a corresponding risk event. As in the previous examples, in some instances, determination (e.g., at 770) of the risk event based on the correlation, can further result in triggering 775 of a countermeasure to counteract the determined risk event.

Figure 7C:
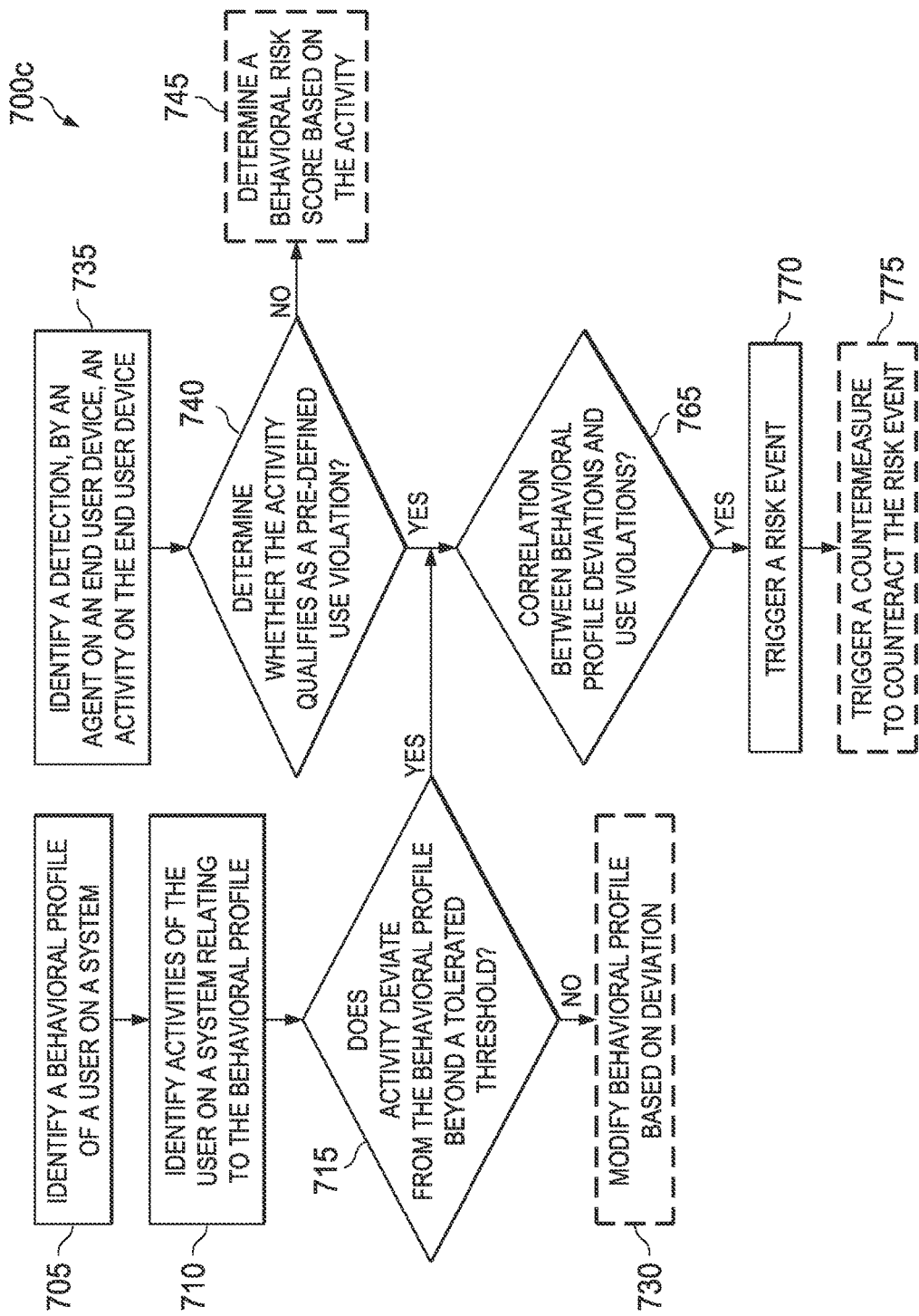

Continuing with the example of FIG. 7C, failure to identify a correlation (e.g., at 765) between the identified deviation from the behavioral profile and the detected use violation at the end user device can nonetheless result in the determination of one or more risk events (e.g., consistent with the triggering 720, 755 of risk events in the examples of FIGS. 7A and 7B). Indeed, separate risk events can be generated corresponding to each of the identified deviation from the behavioral profile and the detected use violation. In some instances, countermeasures (e.g., at 775) applied to remedy determined risk events based on an identified correlation between an identified deviation from a behavioral profile and a detected use violation can be different (e.g., more targeted, more proactive or severe, etc.) than countermeasures applied to risk events determined from a substantially similar deviation from the behavioral profile or detected use violation (i.e., where no correlation was determined 765 and less confidence exists to justify the countermeasure).

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, diverse user interface layouts and functionality can be supported. Additionally, while the above description focuses on applying the above principles to the generation of customized whitelists, similar principles can be applied to generating other such listings used in security tasks, including tailored blacklists. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal per se, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

The operations described in this specification can be implemented as operations performed by a data processing apparatus on data stored on one or more computer-readable storage devices or received from other sources. The terms "data processing apparatus," "processor," "processing device," and "computing device" can encompass all kinds of apparatus, devices, and machines for processing data, including by way of example a programmable processor, a computer, a system on a chip, or multiple ones, or combinations, of the foregoing. The apparatus can include general or special purpose logic circuitry, e.g., a central processing unit (CPU), a blade, an application specific integrated circuit (ASIC), or a field-programmable gate array (FPGA), among other suitable options. While some processors and computing devices have been described and/or illustrated as a single processor, multiple processors may be used according to the particular needs of the associated server. References to a single processor are meant to include multiple processors where applicable. Generally, the processor executes instructions and manipulates data to perform certain operations. An apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, module, (software) tools, (software) engines, or code) can be written in any form of programming language, including compiled or interpreted languages, declarative or procedural languages, and it can be deployed in any form, including as a standalone program or as a module, component, subroutine, object, or other unit suitable for use in a computing environment. For instance, a computer program may include computer-readable instructions, firmware, wired or programmed hardware, or any combination thereof on a tangible medium operable when executed to perform at least the processes and operations described herein. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Programs can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate. In certain cases, programs and software systems may be implemented as a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, applications may represent web-based applications accessed and executed via a network (e.g., through the Internet). Further, one or more processes associated with a particular hosted application or service may be stored, referenced, or executed remotely. For example, a portion of a particular hosted application or service may be a web service associated with the application that is remotely called, while another portion of the hosted application may be an interface object or agent bundled for processing at a remote client. Moreover, any or all of the hosted applications and software service may be a child or sub-module of another software module or enterprise application (not illustrated) without departing from the scope of this disclosure. Still further, portions of a hosted application can be executed by a user working directly at a server hosting the application, as well as remotely at a client.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), tablet computer, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device, including remote devices, which are used by the user.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include any internal or external network, networks, sub-network, or combination thereof operable to facilitate communications between various computing components in a system. A network may communicate, for example, Internet Protocol (IP) packets, Frame Relay frames, Asynchronous Transfer Mode (ATM) cells, voice, video, data, and other suitable information between network addresses. The network may also include one or more local area networks (LANs), radio access networks (RANs), metropolitan area networks (MANs), wide area networks (WANs), all or a portion of the Internet, peer-to-peer networks (e.g., ad hoc peer-to-peer networks), and/or any other communication system or systems at one or more locations.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. At least one non-transitory machine accessible storage medium having instructions stored thereon, the instructions when executed on a machine, cause the machine to:
    receive, at a computing device, first rule data corresponding to a first set of rules maintained at a remote risk assessment engine, wherein the first set of rules is associated with a particular user;
    use the first rule data to monitor user activity on the computing device during a first session;
    detect a particular activity performed by the particular user on the computing device during the first session;
    determine, based on the first rule data, that the particular activity qualifies as a first potential violation;
    send a first report to the risk assessment engine identifying the first potential violation detected at the computing device, wherein the first report identifies the particular user;
    generate behavioral tendency data describing behavioral tendencies of the particular user detected by a behavior monitor executing on the computing device;
    send the behavioral tendency data to the risk assessment engine to apply to a behavior profile of the particular user maintained by the risk assessment engine;

receive an indication from the risk assessment engine, responsive to the first report, that the first potential violation is a violation; and perform a remediation action at the particular computing device based on the indication.

2. A method comprising:

receiving, at a computing device, rule data corresponding to a set of rules maintained at a remote risk assessment engine, wherein the set of rules is associated with a particular user;

using the rule data to monitor user activity on the computing device during a first session;

detecting, at the computing device, a particular activity performed by the particular user on a computing device during the first session;

determining, based on the rule data, that the particular activity qualifies as a potential violation;

sending a report to the risk assessment engine identifying the potential violation detected at the computing device, wherein the first report identifies the particular user;

generating behavioral tendency data describing behavioral tendencies of the particular user detected by a behavior monitor executing on the computing device;

sending the behavioral tendency data to the risk assessment engine to apply to a behavior profile of the particular user maintained by the risk assessment engine;

receiving an indication from the risk assessment engine, responsive to the report, that the potential violation is a violation; and performing a remediation action at the particular computing device based on the indication.

3. A system comprising:

at least one processor device;

at least one memory element; and a user behavioral risk agent installed on a particular computing device, wherein the user behavioral risk agent is executable to:

receive, at a computing device, rule data corresponding to a set of rules maintained at a remote risk assessment engine, wherein the set of rules is associated with a particular user, and the rule data abstracts rules in the set of rules;

use the rule data to monitor user activity on the computing device for violations of the rule data during a particular session;

detect, at the particular computing device, a particular activity performed by the particular user on the particular computing device during the particular session;

determine, based on the rule data, that the particular activity qualifies as a potential violation;

send a report to the risk assessment engine identifying the potential violation detected at the computing device;

generate behavioral tendency data describing behavioral tendencies of the particular user detected by a behavior monitor executing on the computing device;

send the behavioral tendency data to the risk assessment engine to apply to a behavior profile maintained by the risk assessment engine;

receive an indication from the risk assessment engine, responsive to the report, that the potential violation is a violation, wherein the indication is based at least in part on whether the potential violation deviates from the behavior profile; and perform a remediation action at the particular computing device based on the indication.

4. The storage medium of claim 1, wherein the first rule data is stored locally at the computing device together with at least second rule data corresponding to a second set of rules associated with a second user.

5. The storage medium of claim 4, wherein the particular activity is not determined to be a potential violation when the second rule data is applied at the computing device.

6. The storage medium of claim 4, wherein the instructions when executed further cause the machine to:

identify that a second user uses the computing device during a second session;

use the second rule data to monitor user activity on the computing device during the second session;

detect, at the computing device, the particular activity performed by the second user on the computing device during the second session;

determine, based on the second rule data, that the particular activity performed by the second user comprises a second potential violation;

send a second report to the risk assessment engine identifying the second potential violation detected at the computing device; and receive an indication from the risk assessment engine, responsive to the second report, that the second potential violation is not a violation.

7. The storage medium of claim 4, wherein the instructions when executed further cause the machine to:

identify that a second user uses the computing device during a second session;

use the second rule data to monitor user activity on the computing device during the second session;

detect, at the computing device, the particular activity performed by the second user on the computing device during the second session; and determine, based on the second rule data, that the particular activity performed by the second user does not comprise a second potential violation.

8. The storage medium of claim 1, wherein the first set of rules is generated at the risk assessment engine based on the behavior profile.

9. The storage medium of claim 8, wherein the first set of rules is modified based on the first report.

10. The storage medium of claim 1, wherein the report describes context information related to the particular activity.

11. The storage medium of claim 10, wherein the context information describes another activity performed by the user at the computing device during the first session.

12. The storage medium of claim 1, wherein the first rule data is used by a software-implemented agent installed on the computing device and the agent determines that the particular activity performed by the first user comprises the first potential violation.

13. The storage medium of claim 12, wherein the agent communicates directly with the risk assessment engine.

14. The storage medium of claim 12, wherein the indication of the violation triggers a countermeasure to be applied at the computing device.

15. The storage medium of claim 14, wherein the countermeasure is deployed, at least in part, using the agent.

16. The storage medium of claim 14, wherein the indication comprises instructions for use by the agent in deploying the countermeasure.

17. The storage medium of claim 1, wherein the report includes an indication that the particular activity was performed by the first user.

18. The system of claim 3, wherein the rule data comprises first rule data, and the first rule data is stored in the memory together with second rule data corresponding to a second set of rules associated with a second user.

19. The system of claim 3, wherein the system further comprises the risk assessment engine, and the risk assessment engine is executable to:
    receive reports from a plurality of computing devices reporting respective potential violations determined at the computing devices;
    determine whether the potential violations qualify as one of a plurality of defined use violations; and
    determine a behavioral risk score for the first user.

* * * * *